(12) United States Patent
Sakakibara et al.

(10) Patent No.: US 9,853,994 B2
(45) Date of Patent: Dec. 26, 2017

(54) ATTACK ANALYSIS SYSTEM, COOPERATION APPARATUS, ATTACK ANALYSIS COOPERATION METHOD, AND PROGRAM

(71) Applicant: Mitsubishi Electric Corporation, Tokyo (JP)

(72) Inventors: Hiroyuki Sakakibara, Tokyo (JP); Shoji Sakurai, Tokyo (JP); Kiyoto Kawauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 38 days.

(21) Appl. No.: 14/433,560

(22) PCT Filed: Nov. 8, 2013

(86) PCT No.: PCT/JP2013/080252
§ 371 (c)(1),
(2) Date: Apr. 3, 2015

(87) PCT Pub. No.: WO2014/112185
PCT Pub. Date: Jul. 24, 2014

(65) Prior Publication Data
US 2015/0256554 A1    Sep. 10, 2015

(30) Foreign Application Priority Data

Jan. 21, 2013  (JP) ................. 2013-008724

(51) Int. Cl.
| | |
|---|---|
| *H04L 29/06* | (2006.01) |
| *G06F 11/34* | (2006.01) |
| *G06F 21/55* | (2013.01) |

(52) U.S. Cl.
CPC .......... *H04L 63/1433* (2013.01); *G06F 11/34* (2013.01); *G06F 21/55* (2013.01);
(Continued)

(58) Field of Classification Search
CPC ............ H04L 63/1425; H04L 63/0218; H04L 63/1408
(Continued)

(56) References Cited

U.S. PATENT DOCUMENTS 7,089,428 B2   8/2006  Farley et al.
7,313,818 B2  12/2007  Mitomo et al.
(Continued)

FOREIGN PATENT DOCUMENTS

| JP | 2004-537075 A | 12/2004 |
|---|---|---|
| JP | 2005-136526 A | 5/2005 |

(Continued)

OTHER PUBLICATIONS

Extended European Search Report dated May 9, 2016 in European Patent Application No. 13872002.4.
(Continued)

*Primary Examiner* — Ellen Tran
(74) *Attorney, Agent, or Firm* — Oblon, McClelland, Maier & Neustadt, L.L.P.

(57) ABSTRACT

In a log analysis cooperation system including a logger that collects a log of a communication device and stores the log in a storage device, a SIEM apparatus that detects an attack, and a log analysis apparatus that analyzes the log collected by the logger, a log analysis cooperation apparatus stores an attack scenario in a storage device, receives from the SIEM apparatus warning information including information on the detected attack, computes a predicted occurrence time of an attack predicted to occur subsequent to the detected attack based on the warning information and the attack scenario, and transmits to the log analysis apparatus a scheduled search to search the log at predicted occurrence time com-
(Continued)

puted. The log analysis apparatus transmits a scheduled search to the logger to search the log at the predicted occurrence time.

16 Claims, 14 Drawing Sheets

(52) U.S. Cl.
CPC ........ *G06F 21/552* (2013.01); *H04L 63/0218* (2013.01); *H04L 63/1408* (2013.01); *H04L 63/1425* (2013.01)

(58) Field of Classification Search
USPC ..................................................... 726/22, 23
See application file for complete search history.

(56) References Cited

U.S. PATENT DOCUMENTS

| | | | |
|---|---|---|---|
| 7,716,739 | B1 | 5/2010 | McCorkendale |
| 8,166,553 | B2 | 4/2012 | Kubota |
| 2004/0250169 | A1* | 12/2004 | Takemori ............ H04L 63/1425 714/38.1 |
| 2006/0031938 | A1 | 2/2006 | Choi |
| 2007/0169194 | A1 | 7/2007 | Church et al. |
| 2008/0016569 | A1* | 1/2008 | Hammer ............... G06F 21/554 726/23 |
| 2008/0115221 | A1 | 5/2008 | Yun et al. |
| 2009/0126023 | A1 | 5/2009 | Yun et al. |

FOREIGN PATENT DOCUMENTS

| | | |
|---|---|---|
| JP | 2006-504178 A | 2/2006 |
| JP | 3999188 B2 | 10/2007 |
| JP | 4020912 B2 | 12/2007 |
| WO | 03/100619 A1 | 12/2003 |

OTHER PUBLICATIONS

"Design and Operational Guide to Protect against "Advanced Persistent Threats"" A Approach to improve security measures against new cyber security threats, Information-technology Promotion Agency, Japan, Revised $2^{nd}$ edition, Nov. 2011, 126 Pages, with English translation.

International Search Report dated Feb. 10, 2014 in PCT/JP13/080252 Filed Nov. 8, 2013.

Chinese Office Action dated Jan. 3, 2017 in Chinese Patent Application No. 201380070764.1 with translation. (The 2 cited references listed in the Chinese Office Action were previously submitted in the present application.).

Office Action dated Jul. 25, 2017 in Chinese Patent Application No. 201380070764.1 (with English translation).

* cited by examiner

1201: WARNING INFORMATION

DATE AND TIME, ATTACK ID, ATTACK TYPE, VULNERABILITY ID, ATTACK SOURCE INFORMATION, ATACK DESTINATION INFORMATION (a)
```
----------------------------
ADMINISTORATOR PASSWORD WAS UPDATED.
    ADD '!' TO JUST BEFORE FOLLOWING PASSWORD AND ADD ')'
TO END OF FOLLOWING PASSWORD, FOR INPUT AS A PASSWORD.
    J9-nl*%4>^q
----------------------------
```

(b)
```
----------------------------
ADMINISTORATOR PASSWORD WAS UPDATED.
    SELECT NUMBER FOR ANIMAL MATCHING IMAGE,
AND ADD THE NAME TO END OF FOLLOWING PASSWORD, FOR SET AS A PASSWORD.
    J9-nl*%4>^q
----------------------------
```

1. tiger,   2. snake,   3. fish,   4. Michel

ATTACK ANALYSIS SYSTEM, COOPERATION APPARATUS, ATTACK ANALYSIS COOPERATION METHOD, AND PROGRAM

TECHNICAL FIELD

The present invention relates to an attack analysis system, a cooperation apparatus, an attack analysis cooperation method, and a program. More specifically, the invention relates to an attack analysis system in which an attack detection system and a log analysis system are made to cooperate with each other to efficiently perform attack analysis.

BACKGROUND ART

In recent years, an accident where a malware leaks confidential information outside an organization has become a problem. A ciberattack using the malware is increasingly being sophisticated. To take an example, there is an attack referred to as an APT (advanced and persistent threat: Advanced•Persistent•Threat) disclosed in Non Patent Literature 1, or the like.

In the APT, a malware that has intruded into an organization using an attached mail infects a computer. Further, the malware communicates with a C & C (Command & Control) server on the Internet to be operated by an attacker, and downloads a new malware or an attack tool or updates itself. Then, the malware spies into the organization, finds a file server, and leaks a confidential file to the C & C server. When each of these activities is regarded as an attack, respective attacks are carried out in stages, over a long period of time. To take an example, the malware that has infected the computer hides itself after the infection without being active for one month, and then starts to communicate with the C & C server after the one month.

In the APT, a plurality of attacks are carried out at intervals in this manner.

There are various countermeasure methods against the APT. As countermeasure products against the APT, a product for preventing intrusion by a mail, a product for preventing information leakage, and so forth are provided.

Further, there is a method of automatically performing log analysis, as one of the countermeasure methods against the APT. In the method of automatically performing log analysis, logs of network devices such as a computer, a server, and a router, security devices such as a firewall and an intrusion detection system, and so forth are analyzed to examine mutual correlation. Alternatively, an abnormal record is found from a log. The method of automatically performing log analysis is a method of detecting the APT or observing the progress of the APT attack by carrying out such analysis.

As an example of a product for automatically detecting an abnormality by examining a correlation between logs of a security device such as a firewall or an intrusion detection system, there is provided a SIEM (security information and event management: Security•Information•and•Event•Management) system (refer to Patent Literature 1). The SIEM system may also be referred to as an integrated log monitoring system.

There is also a log analysis system in which various logs are drilled down using various keywords, or a status change is displayed chronologically, thereby discovering an abnormality by a human.

Patent Literature 1 proposes a method of introducing a relay server in addition to a business system server to perform user authentication by the relay server and collect a log that has been used.

CITATION LIST

Patent Literature

Patent Literature 1: JP 2004-537075

Non-Patent Literature

Non-Patent Literature 1: "Design and Operational Guide to Protect against "Advanced Persistent Threats"", Revised 2nd edition, JPA (Information-technology Promotion Agency, Japan)

SUMMARY OF INVENTION

Technical Problem

In the SIEM system, an event is monitored in real time on-memory. Thus, there is a problem that complex correlation analysis and correlation analysis of events which frequently occur cannot substantially be performed, so that an adequate countermeasure cannot be taken against the APT.

In the log analysis system, complex search of a plurality of logs may be executed. However, the search needs to be repetitively executed in a short period of time in order to detect an event in real time, as in correlation analysis. Accordingly, there is a problem that enormous computation resources are needed in order to simultaneously execute a lot of search equations.

That is, there is a problem that, when detecting the APT by the method of analyzing a log, neither the SIEM system nor the log analysis system alone can handle the APT.

The present invention has been made to solve the problems as mentioned above. It is an object of the present invention to make a log analysis system to cooperate with a SIEM system, based on an attack scenario with respect to an attack detected by the SIEM system to efficiently discover from a log a trace of an attack that may occur in the future.

Solution to Problem

An attack analysis system according to the present invention may include:
  a log collection apparatus that collects log information of a device connected to a network to be monitored;
  a detection apparatus that detects an attack on the network to be monitored and transmits warning information including an attack occurrence time at which the detected attack has occurred;
  a cooperation apparatus that stores attack scenario information indicating a plurality of attacks predicted to occur on the network to be monitored, computes a predicted occurrence time of an attack predicted to occur at a time before or after the attack occurrence time based on the warning information received from the detection apparatus and the attack scenario information, and transmits a scheduled analysis request that is a request for analyzing the log information at the predicted occurrence time computed; and
  an analysis apparatus that analyzes the log information at the predicted occurrence time out of the log information collected by the log collection apparatus, based on the scheduled analysis request transmitted from the cooperation apparatus.

Advantageous Effects of Invention

According to the attack analysis system of the present invention, the cooperation apparatus stores the attack scenario information in the storage device, receives from the detection apparatus the warning information including information on the detected attack, computes the predicted occurrence time of the attack predicted to occur subsequent to the detected attack based on the warning information and the attack scenario information, and transmits to the analysis apparatus a scheduled search to search for the log information at the computed predicted occurrence time. Thus, there is provided an effect capable of efficiently discovering, from the log information, a trace of the attack that may occur in the future, by making the detection apparatus and the analysis apparatus to cooperate with each other.

DESCRIPTION OF EMBODIMENTS

First Embodiment

Figure 1:
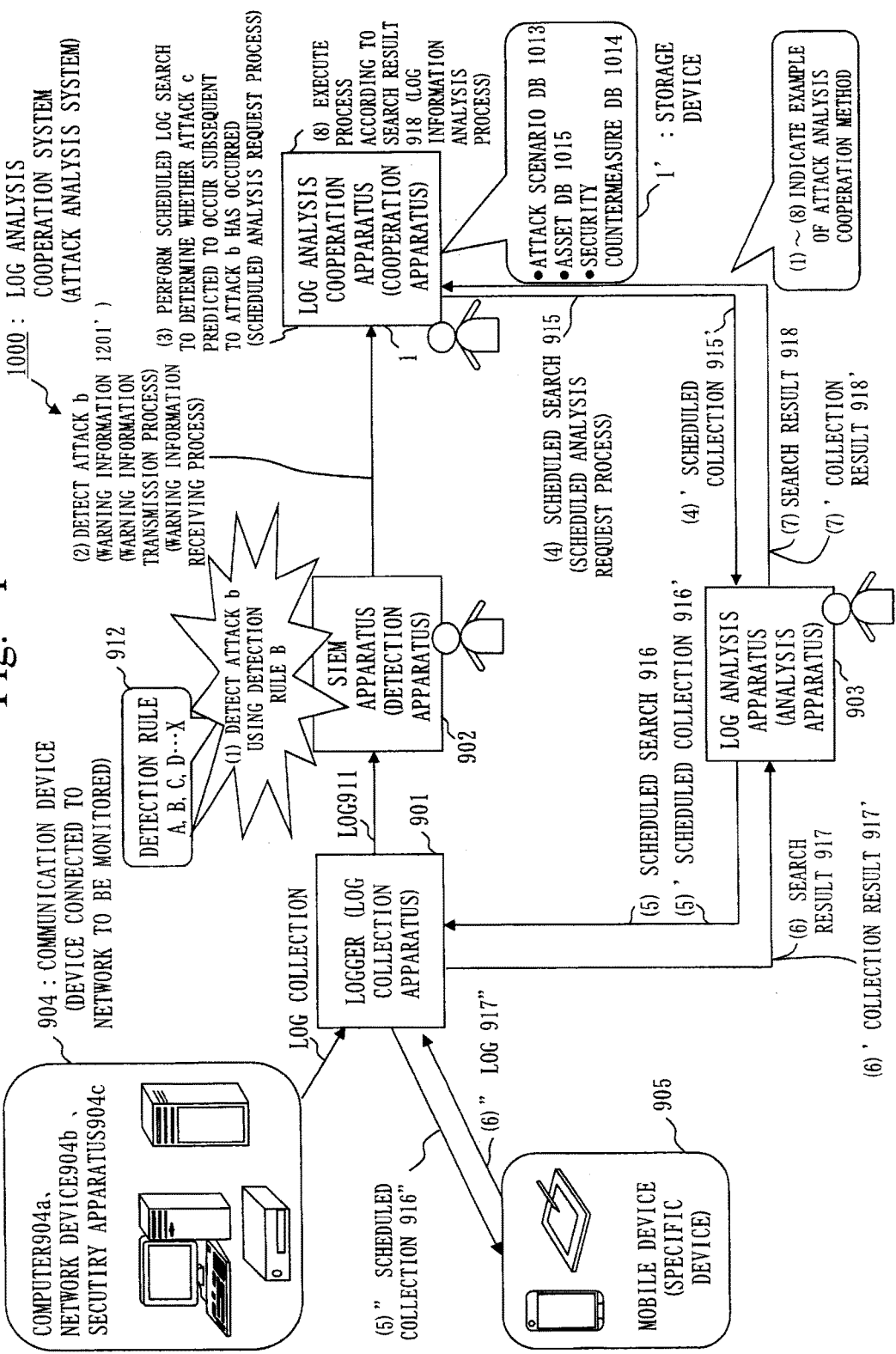
FIG. 1 is a diagram illustrating an overall configuration of a log analysis cooperation system 1000 according to a first embodiment.

FIG. 1 is a diagram illustrating an overall configuration of a log analysis cooperation system 1000 according to this embodiment. The overall configuration and operation of the log analysis cooperation system 1000 (an example of an attack analysis system) according to this embodiment will be outlined, using FIG. 1.

Referring to FIG. 1, the log analysis cooperation system 1000 includes a logger 901 (an example of a log collection apparatus), a SIEM apparatus 902 (an example of a detection apparatus), a log analysis apparatus 903 (an example of an analysis apparatus), and a log analysis cooperation apparatus 1 (an example of a cooperation apparatus).

The logger 901 collects a log of at least one device (a communication device 904) included by a network to be monitored and stores the collected log in a storage device, as log information.

The logger 901 is connected to a computer 904a such as a PC or a server, a network device 904b such as a router, a security device 904c such as a firewall or an intrusion detection device that are to be monitored, and a mobile device 905 such as a smart phone or a tablet PC.

The logger 901 collects and accumulates logs of the computer 904a, the network device 904b, the security device 904c, the mobile device 905 and so forth.

The SIEM apparatus 902 detects an abnormality by performing correlation analysis of the logs accumulated in the logger 901 or the like. The SIEM apparatus 902 includes a detection rule 912. The SIEM apparatus 902 stores the detection rule 912 in a storage device, for example.

The detection rule 912 is a log analysis rule for detecting the abnormality such as an attack. The detection rule 912 is a correlation analysis rule, for example.

The log analysis apparatus 903 performs an analysis by drilling down the logs accumulated in the logger 901 using a keyword search or the like, by an operation of an operator. The log analysis apparatus 903 visualizes a status of an access to a specific server and displays the status so that the status may be seen, by an operation of the operator. In this manner, the log analysis apparatus 903 performs a log analysis, by the operation of the operator, so that the operator discovers an abnormality.

The log analysis cooperation apparatus 1 is located between the STEM apparatus 902 and the log analysis apparatus 903. The log analysis cooperation apparatus 1 is connected to the SIEM apparatus 902, and is connected to the log analysis apparatus 903.

The log analysis cooperation apparatus 1 makes the SIEM apparatus 902 and the log analysis apparatus 903 to cooperate with each other.

The log analysis cooperation apparatus 1 includes an attack scenario DB 1013, an asset DB 1015, and a security countermeasure DB 1014.

An operation of making the SIEM apparatus 902 and the log analysis apparatus 903 to cooperate with each other by the log analysis cooperation apparatus 1 will be outlined.

The SIEM apparatus 902 collects a log 911 from the logger 901, and executes correlation analysis of the log 911 in real time, using the detection rule 912. In this manner, the SIEM apparatus 902 constantly executes abnormality detection.

An example of an operation (attack analysis cooperation method) when the SIEM apparatus 902 detects an abnormality will be described, using FIG. 1. The following (1) to (8) respectively correspond to (1) to (8) at FIG. 1.

(1) The SIEM apparatus 902 detects an attack b (detection attack) according to a detection rule B in the detection rule 912.

(2) The SIEM apparatus 902 notifies detection of the attack b to the log analysis cooperation apparatus 1, as warning information 1201 (a warning information transmission step, or a warning information transmission process). The log analysis cooperation apparatus 1 receives the warning information (a warning information receiving step, or a warning information receiving process).

(3) The log analysis cooperation apparatus 1 searches the DBs for an attack c (subsequent attack) predicted to occur subsequent to the attack b. The log analysis cooperation apparatus 1 determines possibility of occurrence of the attack c predicted to occur subsequent to the attack b, using the attack scenario DB 1013, the asset DB 1015, and the security countermeasure DB 1014. The attack scenario DB 1013, the asset DB 1015, and the security countermeasure DB 1014 are stored in a storage device 1' included by the log analysis cooperation apparatus 1, for example.

(4) The log analysis cooperation apparatus 1 requests the log analysis apparatus 903 to perform a scheduled search 915 in order to search a log for a trace of the attack c. In other words, the log analysis cooperation apparatus 1 computes a time (predicted occurrence time) at which the attack c (the subsequent attack or an analysis target attack) is predicted to occur subsequent to the attack b (detection attack or detected attack) and requests the log analysis apparatus 903 to perform the scheduled search 915 to perform the scheduled search of the log at the time (predicted occurrence time) when the attack c (subsequent attack) is predicted to occur (processes in (3) and (4) constitute a scheduled analysis request step or a scheduled analysis request process).

(5) The log analysis apparatus 903 executes a scheduled search 916 of the logger 901, based on the request for the scheduled search 915.

(6) The log analysis apparatus 903 receives a search result 917 of the scheduled search 916.

(7) The log analysis apparatus 903 transmits the received search result 917 to the log analysis cooperation apparatus 1 as a search result 918.

(8) The log analysis cooperation apparatus 1 receives the result of (7), and executes a process according to the result of (7) (a log information analysis step, or a log information analysis process).

When the attack c is not detected based on the result of (7), the log analysis cooperation apparatus 1 determines that the occurrence time of the attack c may not be in accordance with an attack scenario 1104. Then, the log analysis cooperation apparatus 1 changes the timing of the scheduled search 915, and further issues the scheduled search 915 to the log analysis apparatus 903.

When the attack c is detected based on the result of (7), the log analysis cooperation apparatus 1 notifies to an operator that the attack c has been searched for, on a GUI. Upon receipt of this notification, the operator analyzes the trace of the attack c and so forth in further detail, using the log analysis apparatus 903.

It may be difficult for the mobile device 905 (specific device) to constantly perform log collection due to a constraint of a CPU, a memory, a line, or the like. Accordingly, the logger 901 does not usually perform log collection from the mobile device 905. Alternatively, the logger 901 may perform log collection from the mobile device 905 at a regular interval such as once in a day, or irregularly.

When the log analysis cooperation apparatus 1 determines that the attack c is likely to occur on the mobile device 905 in (1) to (3), the log analysis cooperation apparatus 1 notifies a scheduled collection 915' to the log analysis apparatus 903 before the scheduled search 915 in (4), using the timing of the scheduled search 915 in (4) (in (4)').

The log analysis apparatus 903 notifies to the logger 901 the scheduled collection 915' notified from the log analysis cooperation apparatus 1, as a scheduled collection 916' (in (5)').

When the logger 901 is notified of the scheduled collection 916' from the log analysis apparatus 903, the logger 901 notifies a scheduled collection 916" to the mobile device 905 (in (5)"), and collects a log 917" from the mobile device 905 (in (6)"). The logger 901 transmits a collection result of the log from the mobile device 905 to the log analysis apparatus 903, as a collection result 917' (in (6)').

Upon receipt of the collection result 917' from the logger 901, the log analysis apparatus 903 transmits the collection result 917' to the log analysis cooperation apparatus 1 as a collection result 918' (in (7)').

After this process, the log analysis cooperation apparatus 1, the log analysis apparatus 903, and the logger 901 execute the above-mentioned (4) to (7).

The foregoing description has been given about the outline of the overall configuration and the operation of the log analysis cooperation system 1000.

Figure 2:
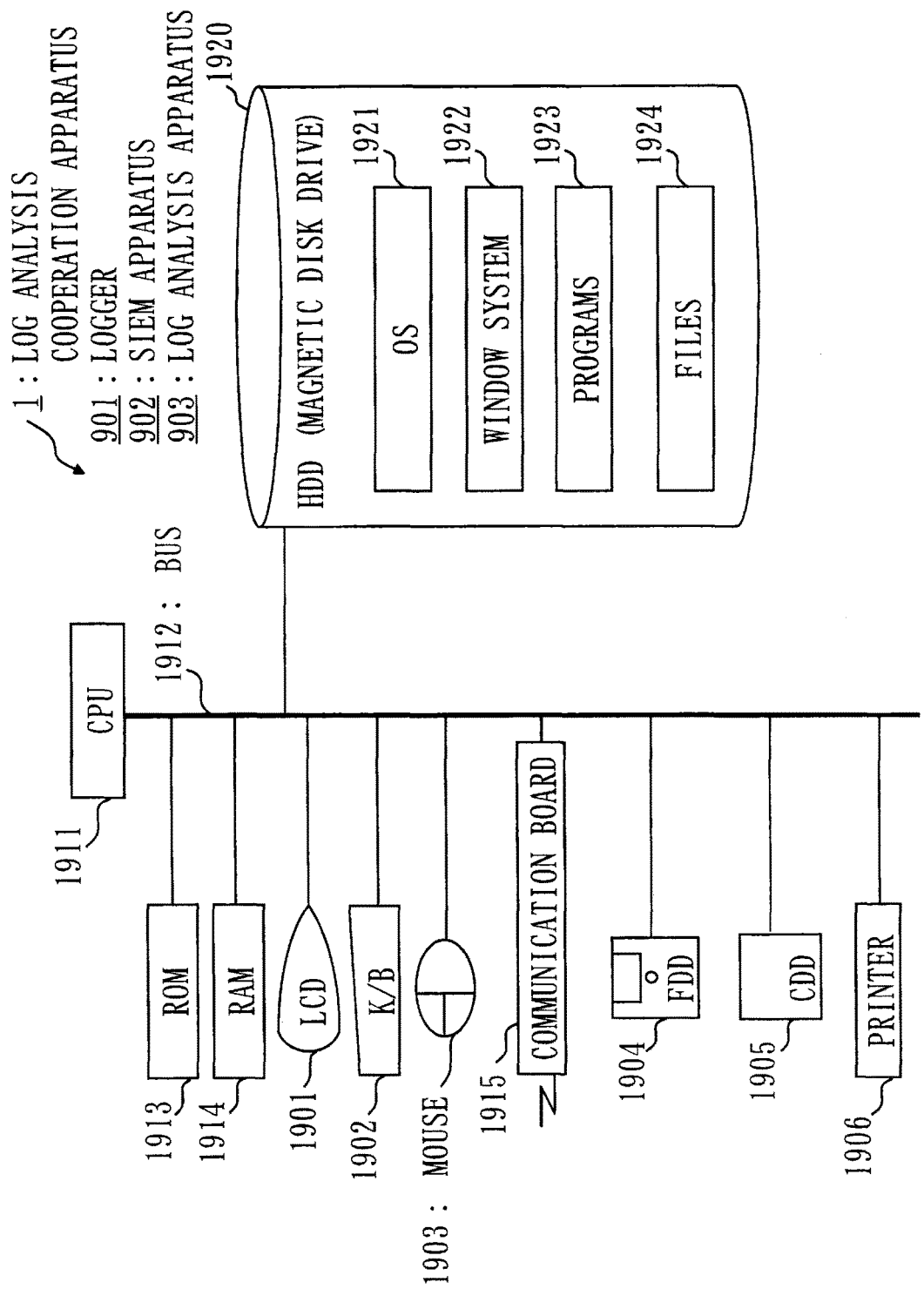
FIG. 2 is a diagram illustrating an example of a hardware configuration of each of a log analysis cooperation apparatus 1, a logger 901, a SIEM apparatus 902, and a log analysis apparatus 903 according to the first embodiment.

FIG. 2 is a diagram illustrating an example of a hardware configuration of each of the log analysis cooperation apparatus 1, the logger 901, the SIEM apparatus 902, and the log analysis apparatus 903 according to this embodiment.

Referring to FIG. 2, each of the log analysis cooperation apparatus 1, the logger 901, the SIEM apparatus 902, and the log analysis apparatus 903 is a computer, and includes hardware devices such as an LCD 1901 (Liquid•Crystal•Display), a keyboard 1902 (K/B), a mouse 1903, an FDD 1904 (Flexible•Disc•Drive), a CDD1905 (Compact•Disc•Drive), and a printer 1906. These hardware devices are connected by cables and signal lines. A CRT (Cathode•Ray•Tube) or other display device may be used in place of the LCD 1901. A touch panel, a touch pad, a track ball, a pen tablet, or other pointing device may be used in place of the mouse 1903.

Each of the log analysis cooperation apparatus 1, the logger 901, the SIEM apparatus 902, and the log analysis apparatus 903 includes a CPU 1911 (Central•Processing•Unit) that executes a program. The CPU 1911 is an example of a processing device. The CPU 1911 is connected to a ROM 1913 (Read•Only•Memory), a RAM 1914 (Random•Access•Memory), a communication board 1915, the LCD 1901, the keyboard 1902, the mouse 1903, the FDD 1904, the CDD 1905, the printer 1906, and an HDD 1920 (Hard•Disk•Drive) through a bus 1912 to drive these hardware devices. A flash memory, an optical disk device, a memory card reader/writer, or other recording medium may be used in place of the HDD 1920.

The RAM 1914 is an example of a volatile memory. The ROM 1913, the FDD 1904, the CDD 1905, and the HDD 1920 are each an example of a non-volatile memory. These devices are each an example of a storage device or a storage unit. The communication board 1915, the keyboard 1902, the mouse 1903, the FDD 1904, and the CDD 1905 are each an example of an input device. The communication board 1915, the LCD 1901, and the printer 1906 are each an example of an output device.

The communication board 1915 is connected to a LAN (Local•Area•Network) or the like. The communication board 1915 may be connected to a WAN (Wide•Area•Network) such as an IP-VPN (Internet•Protocol•Virtual•Private•Network), a wide area LAN, and an ATM (Asynchronous•Transfer•Mode) network, or the Internet, as well as the LAN. The LAN, the WAN, and the Internet are each an example of a network.

An operating system 1921 (OS), a window system 1922, programs 1923, and files 1924 are stored in the HDD 1920. Programs of the programs 1923 are executed by the CPU 1911, the operating system 1921, and the window system 1922. The programs 1923 include programs that execute functions described as "~units" in the description of this embodiment. The programs are read and executed by the CPU 1911. As each item of a "~file", a "database", or a "~table", the files 1924 include data, information, signal values, variable values, and parameters each described in the description of this embodiment as "~data", "~information", a "~ID (identifier)", a "~flag", or a "~result". The "~file", the "~database", and the "~table" are stored in recording media such as the RAM 1914 and the HDD 1920. The data, the information, the signal values, the variable values, and the parameters stored in the recording media such as the RAM 1914 and the HDD 1920 are read out to a main memory or a cache memory by the CPU 1911 through a read/write circuit, and are used for processing (operations) of the CPU 1911 such as extraction, search, reference, comparison, computation, calculation, control, output, printing, and display. During the processing of the CPU 1911 including extraction, search, reference, comparison, computation, calculation, control, output, printing, and display, the data, the information, the signal values, the variable values, and the parameters are temporarily stored in the main memory, the cache memory, or a buffer memory.

Arrow portions of block diagrams and a flow chart used for the description of this embodiment mainly indicate inputs and outputs of data and signals. The data and the signals are recorded in a memory such as the RAM 1914, a flexible disk (FD) of the FDD 1904, a compact disk (CD) of the CDD 1905, a magnetic disk of the HDD 1920, an optical disk, a DVD (Digital•Versatile•Disc), or other recording medium. The data and the signals are transmitted by the bus 1912, signal lines, cables, or other transmission media.

The "~part" described in the description of this embodiment may be a "~circuit", an "~apparatus", or a "device"; or a "~step", an "operation", a "procedure", or a "process". Namely, the "part" described herein may be implemented as firmware stored in the ROM 1913. Alternatively, the "part" described herein may be implemented by only software, or by only hardware such as an element, a device, a substrate, or a wiring line. Alternatively, the "part" described herein may be implemented by a combination of software and hardware, or by a combination of software, hardware, and firmware. The firmware and the software are stored in a recording medium such as a flexible disk, a compact disk, a magnetic disk, an optical disk, or a DVD, as programs. The program is read by the CPU 1911 and is then executed by the CPU 1911. That is, the program causes the computer to function as the "part" described in the description of this embodiment. Alternatively, the program causes the computer to execute the procedure or the method of the "part" described in the description of this embodiment.

Figure 3:
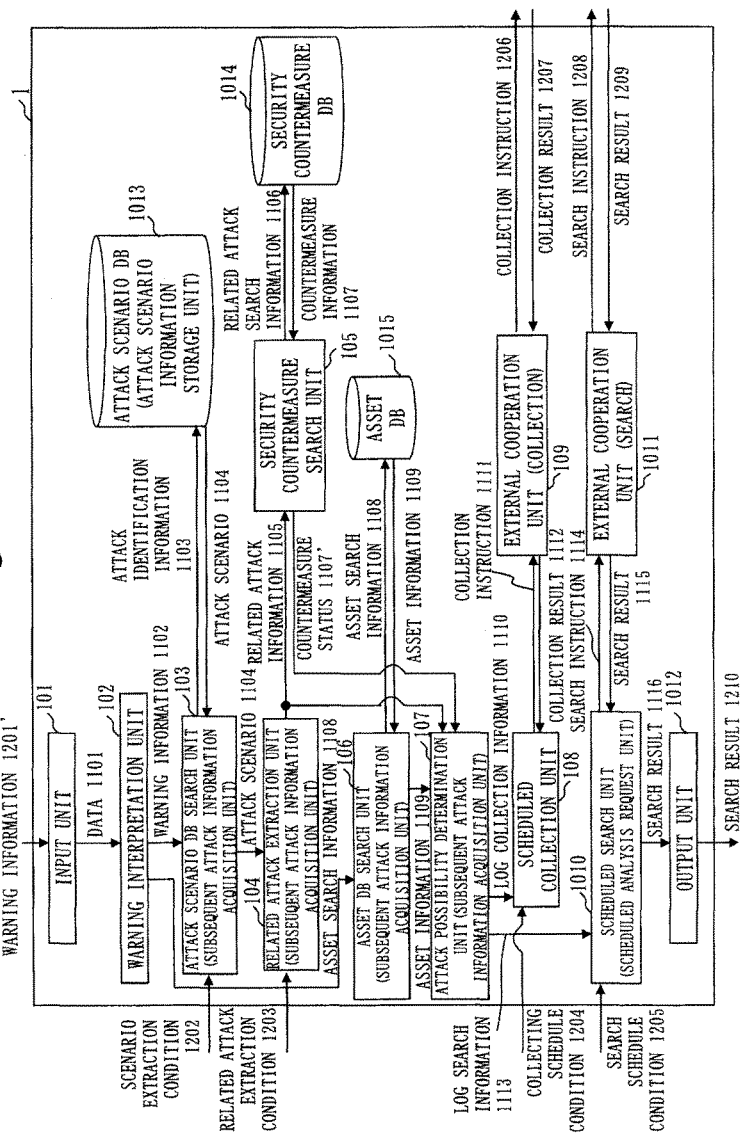
FIG. 3 is a diagram outlining a configuration and operation of the log analysis cooperation apparatus 1 according to the first embodiment.

FIG. 3 is a diagram outlining a configuration and operation of the log analysis cooperation apparatus 1 according to this embodiment.

The configuration of the log analysis cooperation apparatus 1 according to this embodiment will be described, using FIG. 3. The log analysis cooperation apparatus 1 in this embodiment does not use a scheduled collection unit 108, a collecting schedule condition 1204, and an external cooperation unit (collection) 109.

As illustrated in FIG. 3, the log analysis cooperation apparatus 1 includes an input unit 101, an warning interpretation unit 102, an attack scenario DB search unit 103, a related attack extraction unit 104, a security countermeasure search unit 105, an asset DB search unit 106, an attack possibility determination unit 107, a scheduled search unit 1010, an external cooperation unit (search) 1011, and an output unit 1012.

The log analysis cooperation apparatus 1 stores the attack scenario DB 1013, the security countermeasure DB 1014, and the asset DB 1015 in the storage device.

The input unit 101 inputs warning information 1201' and outputs data 1101.

The warning interpretation unit 102 inputs the data 1101, and outputs warning information 1102 and asset search information 1108.

The attack scenario DB search unit 103 inputs a scenario extraction condition 1202, and searches the attack scenario DB 1013, using attack identification information 1103. The attack scenario DB search unit 103 inputs the attack scenario 1104 that is a result of the search. The attack scenario DB search unit 103 outputs the input attack scenario 1104 to the related attack extraction unit 104.

The attack scenario DB 1013 stores a sequence of a plurality of attacks for executing an APT (advanced and persistent threat) and information on a time interval of the sequence and so forth, as each scenario.

The attack scenario DB 1013 is an example of an attack scenario information storage unit that stores attack scenario information in the storage device in advance. The attack scenario information includes a plurality of attack identifiers for respectively identifying the plurality of attacks that are predicted to occur on a network to be monitored. The attack scenario information includes the occurrence order of the plurality of attacks and the occurrence interval of two attacks that are successive in the order.

The related attack extraction unit 104 inputs a related attack extraction condition 1203 and outputs related attack information 1105 to the security countermeasure search unit 105 and the attack possibility determination unit 107.

The security countermeasure search unit 105 inputs the related attack information 1105 and searches the security countermeasure DB 1014, using related attack search information 1106. Then, the security countermeasure search unit 105 inputs a countermeasure status 1107' that is a result of the search. The security countermeasure search unit 105 outputs the countermeasure status 1107' to the attack possibility determination unit 107.

The security countermeasure DB 1014 saves information related to implementation of a countermeasure against an attack by an intrusion detection/defense device or the like.

The asset DB search unit 106 inputs the asset search information 1108, and searches the asset DB 1015 using the asset search information 1108. The asset DB search unit 106 inputs asset information 1109 that is a result of the search.

The asset DB 1015 saves information such as an asset ID, an IP address, an OS in use, an application, and a patch application status of each of a PC, a server, and so forth.

The attack possibility determination unit 107 inputs the asset information 1109, the related attack information 1105, and the countermeasure status 1107', and outputs log search information 1113 to the scheduled search unit 1010.

The attack scenario DB search unit 103, the related attack extraction unit 104, the asset DB search unit 106, and the attack possibility determination unit 107 constitute an example of a subsequent attack information acquisition unit.

The scheduled search unit 1010 inputs a search schedule condition 1205 and the log search information 1113 and outputs a search instruction 1114 to the external cooperation unit (search) 1011. The scheduled search unit 1010 inputs a search result 1115 that is a result of the search instruction 1114. The scheduled search unit 1010 is an example of a scheduled analysis request unit that transmits to the log analysis apparatus 903 the search instruction 1114 (scheduled analysis request) which is a request for analyzing log information at a predicted occurrence time.

The external cooperation unit (search) 1011 inputs the search instruction 1114 from the scheduled search unit 1010, and outputs a search instruction 1208 to an outside. The external cooperation unit (search) 1011 inputs a search result 1209 which is a result of the search instruction 1208, and outputs the search result 1115 to the scheduled search unit 1010.

The output unit 1012 inputs a search result 1116 from the scheduled search unit 1010, and then outputs a search result 1210 to the outside.

Figure 4:
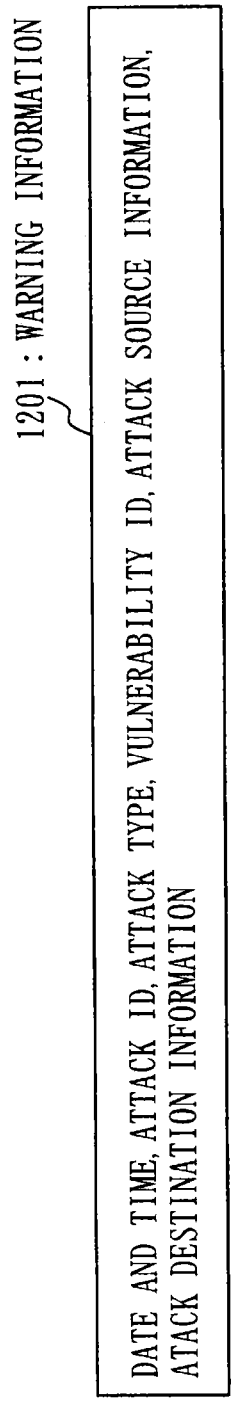
FIG. 4 is a diagram illustrating a configuration example of warning information 1201 according to the first embodiment.
Figure 5:
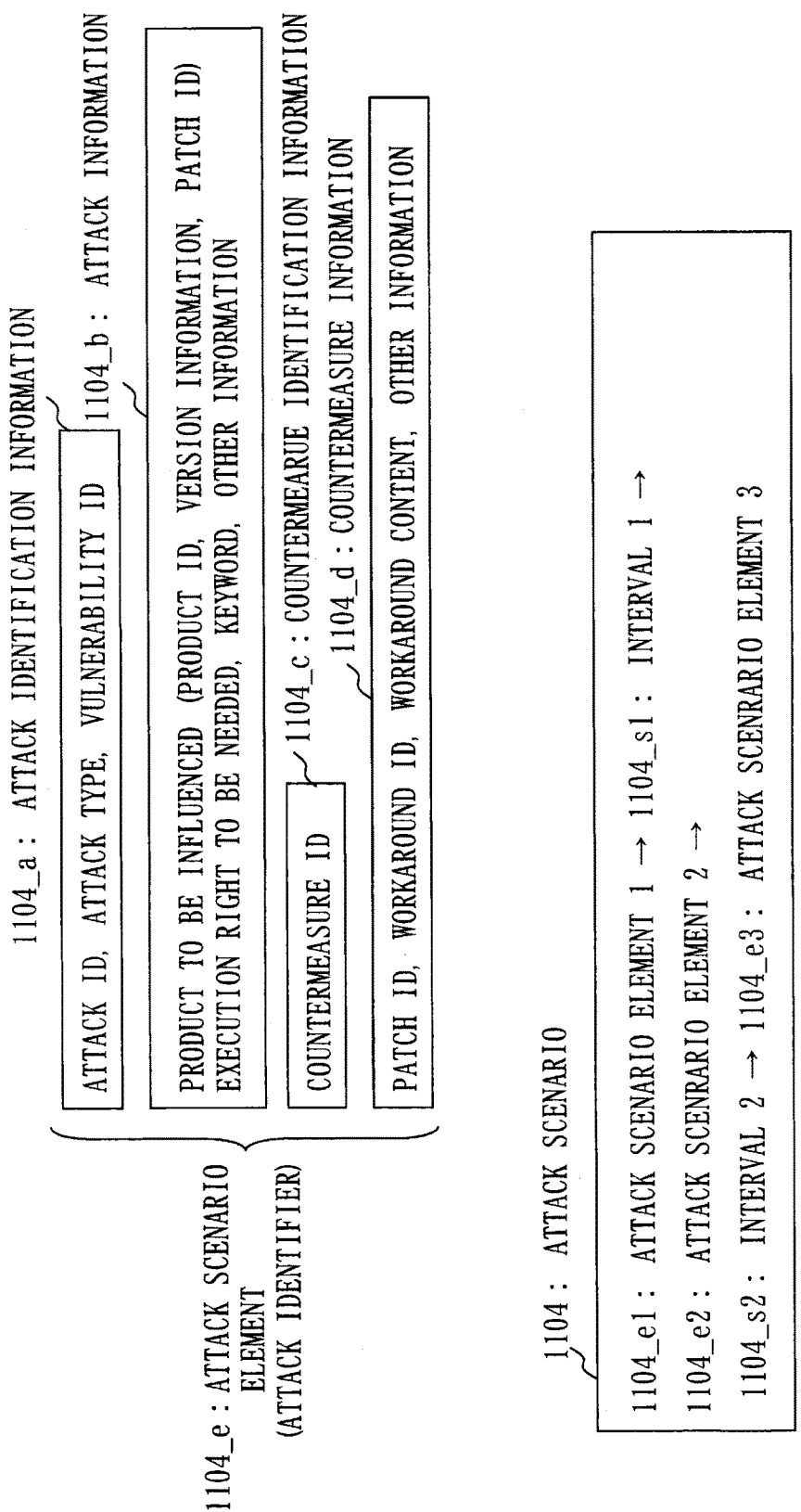
FIG. 5 includes a diagram illustrating a configuration example of an attack scenario 1104 according to the first embodiment.
Figure 6:
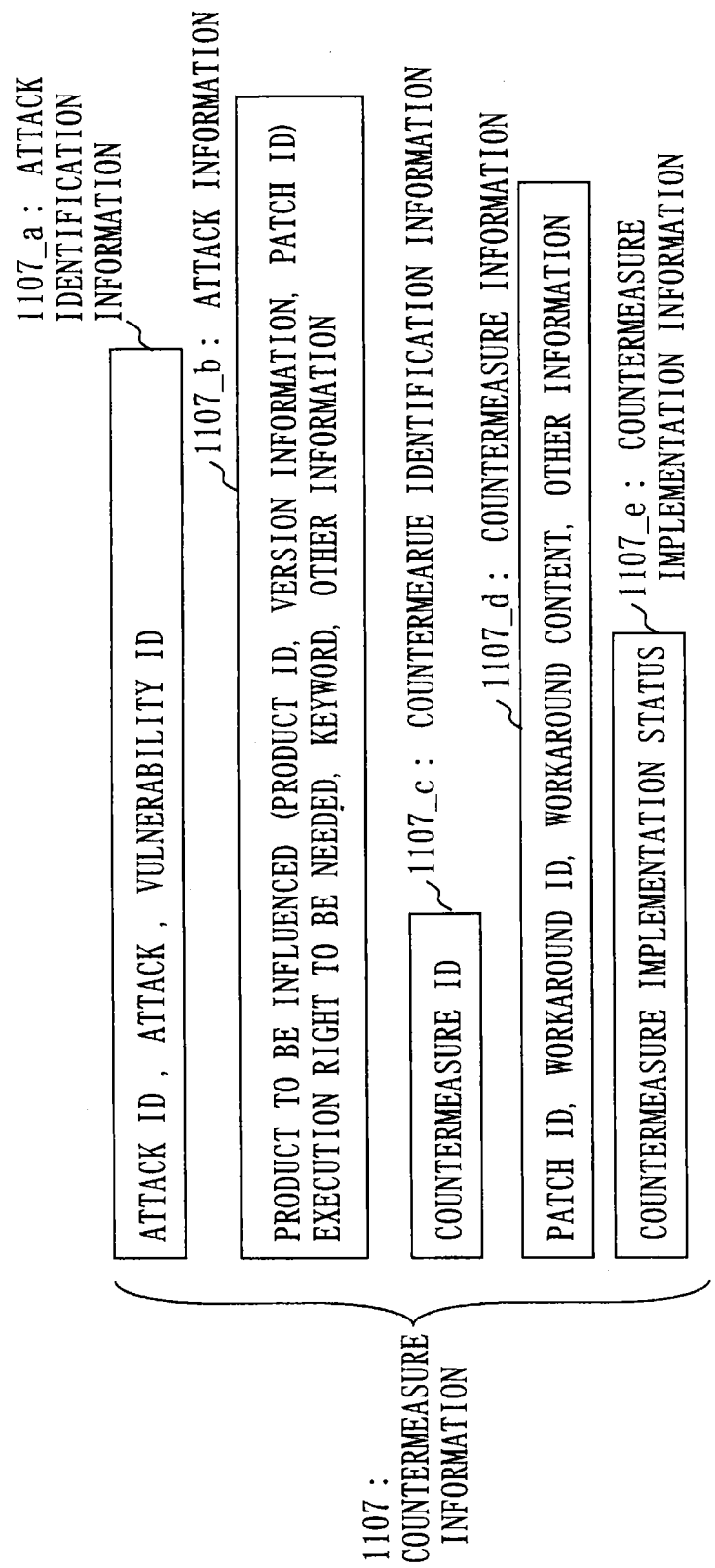
FIG. 6 is a diagram illustrating a configuration example of countermeasure information 1107 according to the first embodiment.
Figure 7:
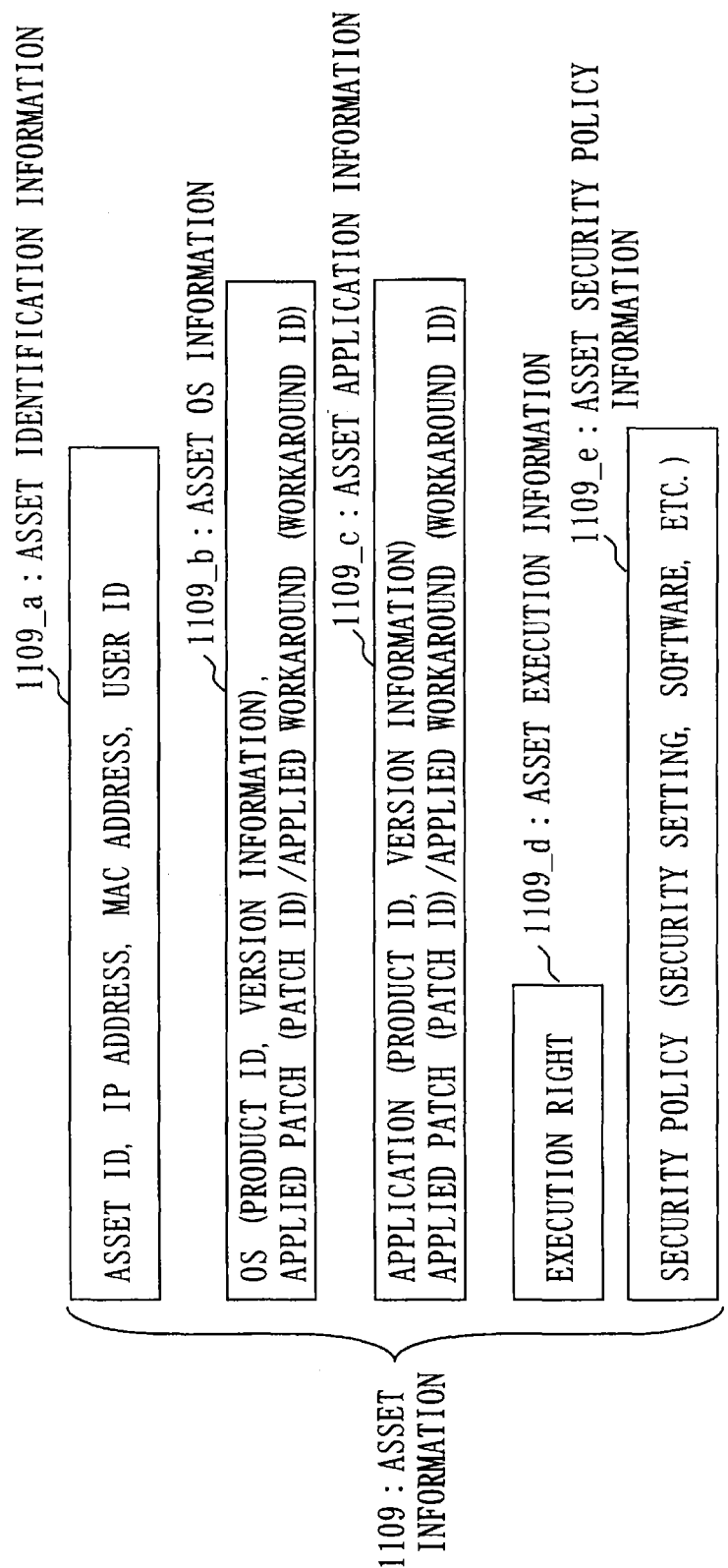
FIG. 7 is a diagram illustrating a configuration example of asset information 1109 according to the first embodiment.

FIG. 4 is a diagram illustrating a configuration example of the warning information 1201 according to this embodiment. FIG. 5 includes a diagram illustrating a configuration example of the attack scenario 1104 according to this embodiment. FIG. 6 is a diagram illustrating a configuration example of countermeasure information 1107 according to this embodiment. FIG. 7 is a diagram illustrating a configuration example of the asset information 1109 according to this embodiment.

Next, the operation of the log analysis cooperation apparatus 1 will be described, using FIG. 1 and FIGS. 3 to 7.

The input unit 101 inputs the warning information 1201' from the SIEM apparatus 902, as illustrated in FIGS. 1 and 3.

The warning information 1201' is information obtained by formatting the warning information 1201 illustrated in FIG. 4. As illustrated in FIG. 4, the warning information 1201 is constituted from the following contents:
  (a) Date and time: a date and time when an attack has occurred;
  (b) Attack ID: information for identifying the attack;
  (c) Attack type: a type of the attack (such as a DoS (Denial•of•Service) attack, or a privilege escalation attack);
  (d) Vulnerability ID: information (such as a CVE number (vulnerability identification number)) for identifying a vulnerability when the attack is established by abusing the vulnerability of software or the like;
  (e) Attack source information: information on an attack source such as a Source IP/Port, or an asset ID;
  (f) Attack destination information: information on an attack destination, such as a Destination IP/Port, or an asset ID.

The log analysis cooperation apparatus 1 inputs the warning information 1201' as a UDP or TCP packet, for example. The warning information 1201' is formatted by storing the warning information 1201 in a body portion of the packet.

The input unit 101 extracts the data 1101 that constitutes the body portion of the packet from the warning information 1201' obtained by formatting the warning information 1201.

Then, the input unit 101 outputs the data 1101 to the warning interpretation unit 102. That is, the data 1101 is the warning information 1201.

The warning interpretation unit 102 inputs the data 1101 that is the warning information 1201. The warning interpretation unit 102 decomposes (interprets) the input data 1101 into components such as the date and time, the attack ID, the attack type, the vulnerability ID, the attack source information, and the attack destination information. The warning interpretation unit 102 outputs a result of this decomposition to the attack scenario DB search unit 103 as the warning information 1102. Contents of the warning information 1102 are the same as the contents of the warning information 1201.

The attack scenario DB search unit 103 extracts, from the warning information 1102, the attack ID, the attack type, and the vulnerability ID, and outputs the attack ID, the attack type, and the vulnerability ID to the attack scenario DB 1013, as the attack identification information 1103.

In this case, the attack scenario DB search unit 103 inputs the scenario extraction condition 1202. The scenario extraction condition 1202 is a condition for specifying the number of attack scenarios 1104 to be searched for from the attack scenario DB 1013. It is assumed that one, a plurality, or a specified number of the attack scenarios 1104 are specified, as the scenario extraction condition 1202. Herein, the number of the attack scenarios 1104 to be searched for from the attack scenarios DB 1013 is specified as "one".

Next, the attack scenario 1104 will be described, using FIG. 5.

The attack scenario including the attack ID or the vulnerability ID is searched for from the attack scenario DB 1013, based on the attack identification information 1103.

As illustrated in FIG. 5, the attack scenario 1104 is constituted as follows:
  1104_e1: an attack scenario element 1→1104_s1: an interval 1→1104_e2: an attack scenario element 2→1104_s2: an interval 2→1104_e3: an attack scenario element 3.

The attack scenario element 1104_ei (i=1, 2, or 3) is information on an individual attack.

Each attack scenario element 1104_ei (i=1, 2, or 3) is constituted from attack identification information 1104_a, attack information 1104_b, countermeasure identification information 1104_c, and countermeasure information 1104_d. These information is an example of an attack identifier for identifying the attack.

As illustrated in FIG. 5, the attack identification information 1104_a, the attack information 1104_b, the countermeasure identification information 1104_c, and the countermeasure information 1104_d are information described below:
  (a) The attack identification information 1104_a: an attack ID, an attack type, and a vulnerability ID;
  (b) The attack information 1104_b: a product to be affected (included as a product ID, version information, and a batch ID), an execution right to be needed, a keyword, and other information;
  (c) The countermeasure identification information 1104_c: a countermeasure ID;
  (d) The countermeasure information 1104_d: a patch ID, a workaround ID, content of the workaround, and other information.

Herein, the keyword of the attack information 1104_b indicates an event that may occur when the attack occurs. To take an example, if registry rewriting of the OS occurs, the keyword is described as "OS, registry, modify".

The attack scenario 1104 depicted in FIG. 5 indicates a scenario in which the attack scenario element 1 of 1104_e1 first occurs, the attack scenario element 2 of 1104_e2 occurs after the interval 1 of 1104_s1, and then the attack scenario element 3 of 1104_e3 occurs after the interval 2 of 1104_s2.

The interval 1 of 1104_s1 is "24 hours", for example. This interval indicates occurrence of the attack scenario element 2 of 1104_e2, after 24 hours after occurrence of the attack scenario element 1 of 1104_e1.

The log analysis cooperation apparatus 1 includes the attack scenario DB storage unit (refer to FIG. 3). The attack scenario DB storage unit generates the attack scenario 1104 as mentioned above, based on a past instance, and stores the attack scenario 1104 in the attack scenario DB 1013.

The number of the attack scenario elements 1104_ei that constitutes the attack scenario 1104 is one or more. It may be so arranged that two, three, or more of the attack scenario elements 1104_ei constitute the attack scenario 1104.

The attack scenario DB search unit 103 searches the attack scenario DB 1013, using the attack identification information 1103. To take an example, the attack scenario DB search unit 103 searches for "the attack scenario having the attack ID included in the attack identification information 1104_a of an attack scenario element 1104_e". The attack ID is a component of the attack identification information 1103.

The attack scenario DB search unit 103 searches for the attack scenario using the vulnerability ID unless the attack scenario DB search unit 103 obtains a result of the search using the attack ID.

The attack scenario DB search unit 103 extracts from the attack scenario DB 1013 the result obtained by the search executed in the above-mentioned manner, as the attack scenario 1104.

As mentioned above, the log analysis cooperation apparatus 1 extracts from the attack scenario DB 1013 the attack scenario 1104 including the attack notified by the warning information 1201' received from the SIEM apparatus 902.

The attack scenario DB search unit 103 outputs the attack scenario 1104 input from the attack scenario DB 1013 to the related attack extraction unit 104.

The related attack extraction unit 104 inputs the attack scenario 1104 and analyzes the attack scenario 1104 using the processing device. The related attack extraction unit 104 extracts information related to the notified attack included in the attack scenario 1104.

In this case, the related attack extraction unit 104 inputs the related attack extraction condition 1203. The related attack extraction condition 1203 includes the following content:

(a) n attack(s) (1~all) predicted to occur subsequent to the notified attack, or m attack(s) (1~all) predicted to have occurred before the notified attack.

When the related attack extraction condition 1203 specifies "the number of attacks predicted to occur subsequent to the notified attack is one", for example, the related attack extraction unit 104 extracts only information on the attack predicted to occur subsequent to the notified attack and an interval between the notified attack and the attack predicted to occur subsequent to the notified attack. When the related attack extraction condition 1203 specifies "the number of attacks predicted to occur subsequent to the notified attack is all", the related attack extraction unit 104 extracts information on the all attacks predicted to occur subsequent to the notified attack and intervals between the all attacks.

Each attack to be extracted by the related attack extraction unit 104 is an example of an analysis target attack, which is predicted to occur in a period before or after the notified attack.

When the related attack extraction condition 1203 specifies "the number of attacks predicted to have occurred before the notified attack is one", for example, the related attack extraction unit 104 extracts only information on the attack predicted to have occurred before the notified attack and the interval between the notified attack and the attack predicted to have occurred before the notified attack. When the related attack extraction condition 1203 specifies "the number of attacks predicted to have occurred before the notified attack is all", the related attack extraction unit 104 extracts information on the all attacks predicted to have occurred before the notified attack and intervals between the all attacks.

It is assumed herein that the related attack extraction condition 1203 specifies "the number of attacks predicted to occur subsequent to the notified attack is one".

Let us assume that the attack ID included in the warning information 1102 is the attack ID of the attack scenario element 2 of 1104_e2.

The attack scenario DB search unit 103 extracts the attack scenario 1104 depicted in FIG. 5 from the attack scenario DB 1013.

Then, the related attack extraction unit 104 inputs the related attack extraction condition 1203 specifying "the number of attacks predicted to occur subsequent to the notified attack is one", extracts from the attack scenario 1104 the "attack scenario element 3 of 1104_e3" as the attack subsequent to the attack scenario element 2 of 1104_e2 (notified attack), and then extracts the "interval 2 of 1104_s2" as the "interval".

That is, the related attack information 1105 extracted by the related attack extraction unit 104 is the "attack scenario element 3 of 1104_e3" as the "attack predicted to occur subsequent to the notified attack" (subsequent attack) (analysis target attack) and the "interval 2 of 1104_s2" (subsequent occurrence interval) as the "interval".

As mentioned above, the related attack extraction unit 104 extracts the related attack information 1105.

Next, the related attack extraction unit 104 outputs the related attack information 1105 to the security countermeasure search unit 105.

The security countermeasure search unit 105 searches the security countermeasure DB 1014, using the related attack information 1105 that has been input. Specifically, the security countermeasure search unit 105 searches the security countermeasure DB 1014, using the "attack scenario element 3 of 1104_e3" and the "interval 2 of 1104_s2" included in the input related attack information 1105.

FIG. 6 is a diagram illustrating a configuration of the countermeasure information 1107 stored in the security countermeasure DB 1014.

The configuration of the countermeasure information 1107 will be described, using FIG. 6.

Each countermeasure information 1107 is constituted from attack identification information 1107_a, attack information 1107_b, countermeasure identification information 1107_c, countermeasure information 1107_d, and countermeasure implementation information 1107_e.

The attack identification information 1107_a, the attack information 1107_b, the countermeasure identification information 1107_c, the countermeasure information 1107_d, and the countermeasure implementation information 1107_e have the following contents:

(a) The attack identification information 1107_a: an attack ID, an attack type, and a vulnerability ID;
(b) The attack information 1107_b: a product to be affected (included as a product ID, version information, and a patch ID), an execution right to be needed, a keyword, and other information;
(c) The countermeasure identification information 1107_c: a countermeasure ID;
(d) The countermeasure information 1107_d: a patch ID, a workaround ID, content of the workaround, and other information;
(e) The countermeasure implementation information 1107_e: a countermeasure implementation status (indicating whether or not a countermeasure is currently being taken by the intrusion detection device or the like).

The security countermeasure search unit 105 extracts the countermeasure information 1107 associated with the input related attack information 1105 from the security countermeasure DB 1014, using the input related attack information 1105. Specifically, the security countermeasure search unit 105 extracts an entry of the countermeasure information 1107 including the attack ID or the vulnerability ID included in the "attack identification information 1104_a" constituting the "attack scenario element 3 of 1104_e3" included in the input related attack information.

The security countermeasure search unit 105 extracts the countermeasure implementation information 1107_e in the extracted entry of the countermeasure information 1107. The security countermeasure search unit 105 extracts the countermeasure implementation status, which is the content of the extracted countermeasure implementation information 1107_e, as the countermeasure status 1107'.

The security countermeasure search unit 105 outputs the countermeasure status 1107' extracted from the security countermeasure DB 1014 to the attack possibility determination unit 107.

The asset DB search unit 106 inputs the assessed search information 1108 from the warning interpretation unit 102.

The asset search information 1108 is information, which is a part of the warning information 1102 (corresponding to the warning information 1201 in FIG. 4). The attack destination information corresponds to the asset search information 1108.

The attack destination information is information such as the Destination IP/Port or the asset ID, which is related to the attack destination.

The asset DB search unit 106 sets, out of this attack destination information, information such as the Destination IP (or MAC) or the asset ID that can identify an asset, as the asset search information 1108.

The asset DB search unit 106 outputs the asset search information 1108 to the asset DB 1015.

The asset DB search unit 106 searches the asset DB 1015, using the asset search information 1108 (information that can identify the asset).

The asset DB search unit 106 extracts from the asset DB 1015 an entry matching the asset search information 1108, as the asset information 1109.

FIG. 7 is a diagram illustrating the configuration of the asset information 1109 managed by the asset DB 1015.

The configuration of the asset information 1109 will be described, using FIG. 7.

The asset information 1109 is constituted from asset identification information 1109_a, asset OS information 1109_b, asset application information 1109_c, asset execution information 1109_d, and asset security policy information 1109_e. The asset identification information 1109_a, the asset OS information 1109_b, the asset application information 1109_c, the asset execution information 1109_d, and the asset security policy information 1109_e that constitute the asset information 1109 have the following contents, for example:
(a) The asset identification information 1109_a: an asset ID, an IP address, a MAC address, and a user ID;
(b) The asset OS information 1109_b: an OS (included as a product ID and version information), an applied patch (included as a patch ID)/applied workaround (included as a workaround ID);
(c) The asset application information 1109_c: an application (included as a product ID and version information), an applied patch (included as a patch ID)/applied workaround (included as a workaround ID);
(d) The asset execution information 1109_d: an execution right;
(e) The asset security policy information 1109_e: a security policy (included as security setting, software, etc.).

That is, the asset DB 1015 searches for an entry in which the Destination IP (or MAC) of the asset search information 1108 (attack destination information)/asset ID matches the asset identification information 1109_a, from among entries stored in the asset DB 1015, and outputs the entry to the asset DB search unit 106, as the asset information 1109.

The asset DB search unit 106 outputs the asset information 1109 input from the asset DB 1015 to the attack possibility determination unit 107.

The attack possibility determination unit 107 inputs the asset information 1109, the related attack information 1105, and the countermeasure status 1107', and outputs the log search information 1113.

The attack possibility determination unit 107 executes an attack possibility determination process, thereby outputting the log search information 1113.

Figure 8:
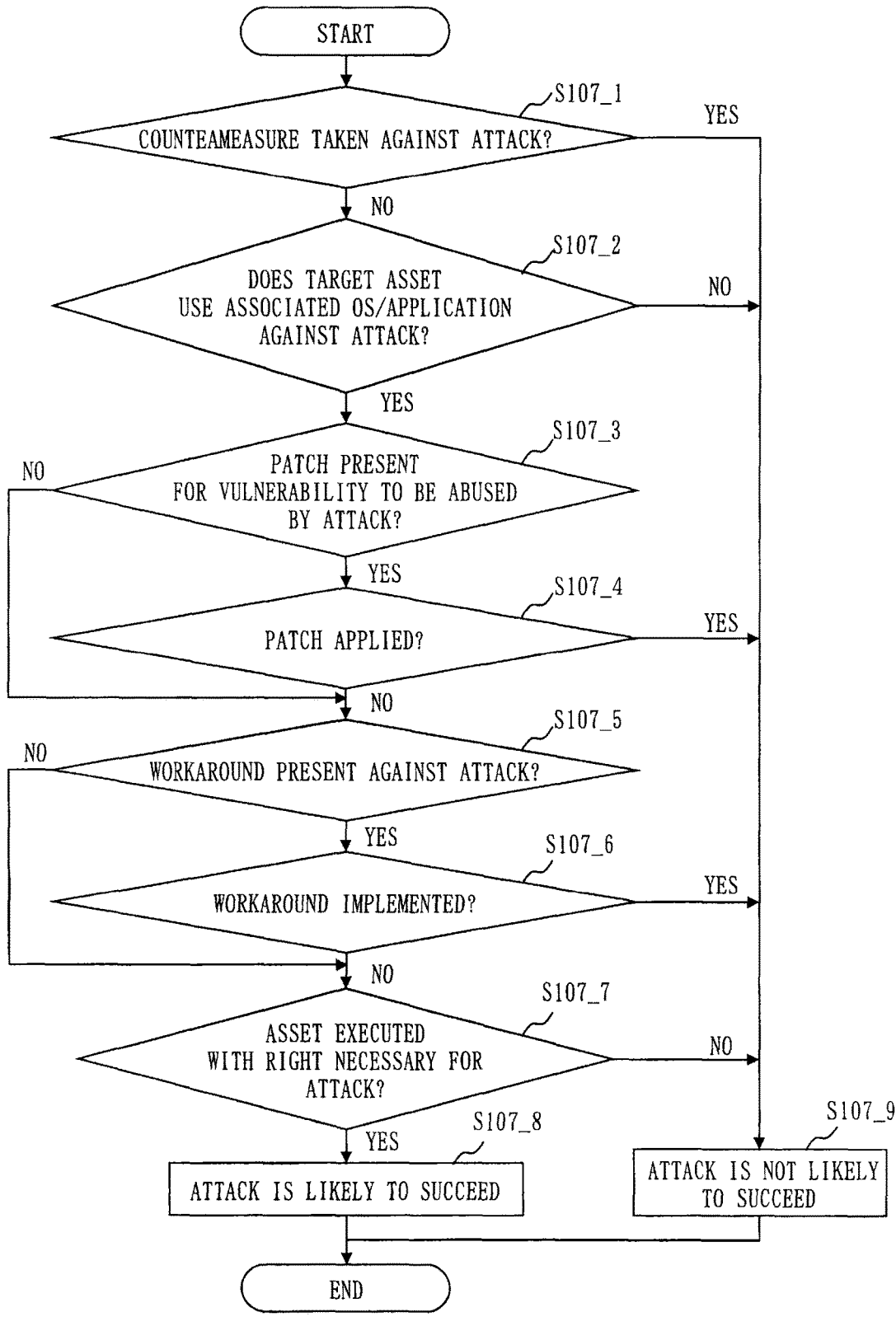
FIG. 8 is a flowchart illustrating an attack possibility determination process by an attack possibility determination unit 107 according to the first embodiment.

FIG. 8 is a flowchart illustrating the attack possibility determination process by the attack possibility determination unit 107 according to this embodiment. The attack possibility determination process by the attack possibility determination unit 107 will be described, using FIG. 8.

In step S107_1, the attack possibility determination unit 107 determines, by the processing device, whether or not a countermeasure against the attack identified by the attack identification information 1104_a included in the related attack information 1105 (attack scenario element 1104_e) has been taken by the intrusion detection device or the like, using the countermeasure status 1107'. Hereinafter, the attack identified by the attack identification information 1104_a included in the related attack information 1105 (attack scenario element 1104_e) will be referred to as a determination target attack.

Specifically, the attack possibility determination unit 107 determines, by the processing device, whether or not the countermeasure against the attack (determination target attack) identified by the attack identification information 1104_a of the attack (attack scenario element 3 of 1104_6) subsequent to the notified attack (attack scenario element 2 of 1104_e2) has been taken by the intrusion detection device or the like, using the countermeasure status 1107'.

The attack possibility determination unit 107 causes the procedure to proceed to step S107_9 when the countermeasure against the determination target attack is determined to have been taken (YES in step S107_1). The attack possibility determination unit 107 causes the procedure to proceed to step S107_2 when the countermeasure against the determination target attack is determined not to have been taken (NO in step S107_1).

In step S107_2, the attack possibility determination unit 107 checks whether the asset to be attacked by the determination target attack uses an OS or an application associated with the determination target attack.

This process is executed as follows.

As mentioned above, the attack possibility determination unit 107 inputs the related attack information 1105 associated with the determination target attack. The attack information 1104_b in the related attack information 1105 (attack scenario element 1104_e) includes information on the product to be affected, as "the product ID, the version information, and the patch ID" (refer to FIG. 5).

Further, as described above, the attack possibility determination unit 107 inputs the asset information 1109 associated with the determination target attack.

The asset information 1109 includes the asset OS information 1109_b (on the OS (included as the product ID and the version information), the applied patch (included as the patch ID)/applied workaround (included as the workaround ID)) and the asset application information 1109_c (on the application (included as the product ID and the version information), the applied patch (included as the patch ID)/applied workaround (included as the workaround ID)). The applied workarounds (included as the workaround IDs) in the asset OS information 1109_b and in the asset application information 1109_c may be set as policy settings.

The attack possibility determination unit 107 determines, by the processing device, whether the asset targeted for the attack uses the product to be affected, based on the related attack information 1105 associated with the determination target attack and the asset information 1109 associated with the determination target attack.

Specifically, the attack possibility determination unit 107 determines, by the processing device, whether the information on the product to be affected in the attack information 1104_b, which is included as "the product ID, the version information, and the patch ID" corresponds to "the OS (included as the product ID and the version information) and the applied patch (included as the patch ID)" of the asset OS information 1109_b, or corresponds to "the application (included as the product ID and the version information) and the applied patch (included as the patch ID)" of the asset application information 1109_c.

That is, "the product ID, the version information, and the patch ID" are information included in all of the attack information 1104_b, the asset OS information 1109_b, and the asset application information 1109_c. Thus, it can be determined whether or not there is the product to be affected by the attack, by matching the product IDs, the version information, and the patch IDs.

The attack possibility determination unit 107 causes the procedure to proceed to step S107_3 when the attack possibility determination unit 107 determines that the asset targeted for the attack uses the product to be affected (YES in step S107_2). When the attack possibility determination unit 107 determines that the asset targeted for the attack does not use the product to be affected (NO in step S107_2), the attack possibility determination unit 107 causes the procedure to proceed to step S107_9.

The attack possibility determination unit 107 determines, by the processing device, whether or not there is a patch against the attack identified by the attack identification information 1104_a included in the related attack information 1105 (corresponding to the attack scenario element 1104_e), in step S107_3.

This presence or absence of the patch is determined by whether or not the patch ID is present in information of the countermeasure information 1104_d included in the related attack information (corresponding to the attack scenario element 1104_e).

When the attack possibility determination unit 107 determines that the patch ID is present (YES in step S107_3), the attack possibility determination unit 107 causes the procedure to proceed to step S107_4. When the attack possibility determination unit 107 determines that the patch ID is not present (NO in step S107_3), the attack possibility determination unit 107 causes the procedure to proceed to step S107_5.

The attack possibility determination unit 107 determines, by the processing device, whether or not the patch is applied against the attack identified by the attack identification information 1104_a included in the related attack information 1105 (corresponding to the attack scenario element 1104_e), in step S107_4.

This application of the patch is determined by whether or not the patch ID in the information of the countermeasure information 1104_d included in the related attack information 1105 (corresponding to the attack scenario element 1104_e) matches the patch ID in the asset OS information 1109_b or the asset application information 1109_c in the asset information 1109.

When the attack possibility determination unit 107 determines that the patch IDs match with each other (YES in step S107_4), the attack possibility determination unit 107 causes the procedure to step S107_9. When the attack possibility determination unit 107 determines that the patch IDs do not match with each other (NO in step S107_4), the attack possibility determination unit 107 causes the procedure to step S107_5.

In step S107_5, the attack possibility determination unit 107 determines, by the processing device, whether or not there is a workaround against the attack identified by the attack identification information 1104_a included in the related attack information 1105 (corresponding to the attack scenario element 1104_e).

This presence or absence of the workaround is determined by whether or not the workaround ID is present in the information of the countermeasure information 1104_d included in the related attack information 1105 (corresponding to the attack scenario element 1104_e).

When the attack possibility determination unit 107 determines that the workaround ID is present (YES in step S107_5), the attack possibility determination unit 107 causes the procedure to proceed to step S107_6. When the attack possibility determination unit 107 determines that the workaround ID is not present (NO in step S107_5), the attack possibility determination unit 107 causes the procedure to proceed to step S107_7.

In step S107_6, the attack possibility determination unit 107 determines, by the processing device, whether or not the workaround determined to be present in step S107_5 is implemented for the asset targeted for the attack.

This implementation of the workaround is determined by whether or not the applied workaround (included as the workaround ID) in the asset OS information 1109_b or the asset application information 1109_c in the asset information 1109 matches the workaround ID identified in step S107_5.

When the attack possibility determination unit 107 determines that the workaround IDs match with each other (YES in steep S107_6), the attack possibility determination unit 107 causes the procedure to proceed to step S107_9. When the attack possibility determination unit 107 determines that the workaround IDs do not match with each other (NO in steep S107_6), the attack possibility determination unit 107 causes the procedure to proceed to step S107_7.

In step S107_7, the attack possibility determination unit 107 determines, by the processing device, whether or not the asset targeted for the attack is executed with an execution right needed for the attack identified by the attack identification information 1104_a included in the related attack information 1105 (corresponding to the attack scenario element 1104_e).

This determination should be made by determining whether or not the execution right needed by the attack information 1104_b included in the attack scenario element 1104_e matches the execution right of the asset execution information 1109_d in the asset information 1109.

When the execution right is implemented in each of the attack information 1104_b included in the attack scenario element 1104_e and the asset execution information 1109_d of the asset information 1109, an ID (identifier) is given for each type of the execution rights, thereby making it easy to perform comparison between the execution rights.

When the attack possibility determination unit 107 determines that the execution rights match with each other (YES in step S107_7), the attack possibility determination unit 107 causes the procedure to proceed to step S107_8. When the attack possibility determination unit 107 determines that the execution rights do not match with each other (NO in step S107_7), the attack possibility determination unit 107 causes the procedure to proceed to step S107_9.

Finally, in step S107_8, the attack possibility determination unit 107 determines that "the attack is likely to succeed".

In step S107_9, the attack possibility determination unit 107 determines that "the attack is not likely to succeed".

The foregoing description has been given about the attack possibility determination process by the attack possibility determination unit 107.

As mentioned above, the attack possibility determination unit 107 executes the attack possibility determination process illustrated in FIG. 8, and makes determination as to whether the attack is likely to succeed or the attack is not likely to succeed.

When the attack possibility determination unit 107 determines that the attack is likely to succeed, the attack possibility determination unit 107 generates the log search information 1113, and then outputs the generated log search information 1113 to the scheduled search unit 1010.

The attack possibility determination unit 107 generates the log search information 1113 that has information that will be described below.

The attack possibility determination unit 107 computes a time at which the attack scenario element 3 is predicted to subsequently occur, based on the "interval 2 of 1104_s2" in the related attack information 1105. To take an example, when the date and time (attack occurrence date and time) of the notified attack (the attack scenario element 2) is "2012/09/24, 09:00:00" in the warning information 1201 and the "interval 2 of 1104_s2" is "24 hours", "2012/09/25, 09:00:00" is computed as a predicted attack occurrence date and time.

The attack possibility determination unit 107 generates an instruction to search a log, based on the predicted attack occurrence date and time and the asset identification information 1109_a in the asset information 1109.

When an access to this asset is searched for from a firewall log, for example, an instruction to search the firewall log is as follows.

It is assumed that, due to the determination target attack, a deny occurs in a part of the firewall log. It is assumed that this information is recorded in the keyword of the attack information 1104_b that is a component of the attack scenario element 3.

<Firewall Log Search Instruction>
(a) Search condition: "predicted attack occurrence date and time" and "IP address (of the asset) is destination" and "keyword (firewall, deny)"
(b) Search target log: the firewall log When searching an asset log of the asset to be attacked by the determination target attack, an instruction to search the asset log is as follows.

It is assumed that, due to the determination target attack, registry rewriting occurs in an OS log. This information is recorded in the attack information 1104_b that is the component of the attack scenario element 3.

<Asset Log Search Instruction>
(a) Search condition: "predicted attack occurrence date and time" and "("IP address" or "MAC address" or "asset ID" (all held by the asset)" and "keyword (OS, registry, modify)".
(b) Search target log: the log of the asset (such as the OS or the application).

As mentioned above, the attack possibility determination unit 107 generates the log search information 1113 for the log from which the access to the asset or the status of the OS or the application on the asset on the predicted attack occurrence date and time may be grasped.

The log search information 1113 is the above-mentioned firewall log search instruction, the above-mentioned asset log search instruction, or the like.

The attack possibility determination unit 107 outputs the generated log search information 1113 to the scheduled search unit 1010.

The scheduled search unit 1010 inputs the log search information 1113 from the attack possibility determination unit 107.

Further, the scheduled search unit 1010 inputs the search schedule condition 1205.

The search schedule condition 1205 is the one in which a condition when the log analysis apparatus 903 performs search based on a schedule is specified. To take an example, a condition of searching a log for one hour from the predicted attack occurrence date and time or the like may be specified in the search schedule condition 1205.

It is assumed herein that nothing is specified in the search schedule condition 1205.

The scheduled search unit 1010 inputs the log search information 1113 and the search schedule condition 1205, and then converts the log search information 1113 and the search schedule condition 1205 to the search instruction 1114 that may be interpreted by the log analysis apparatus 903. The scheduled search unit 1010 outputs the search instruction 1114 obtained by the conversion to the external cooperation unit (search) 1011.

The external cooperation unit (search) 1011 inputs the search instruction 1114, and transmits the input search instruction 1114 to the log analysis apparatus 903 (log analysis system) that is present outside the log analysis cooperation apparatus 1, as the search instruction 1208. This process corresponds to the scheduled search 915 at (4) in FIG. 1.

The log analysis apparatus 903 receives the search instruction 1208. The log analysis apparatus 903 executes the search on the predicted attack occurrence date and time, according to the received search instruction 1208. This process corresponds to the scheduled search 916 at (5) in FIG. 1.

The log analysis apparatus 903 transmits whether or not an entry has been searched for by the scheduled search (presence or absence of the entry) to the log analysis cooperation apparatus 1, as the search result 1209.

The external cooperation unit (search) 1011 of the log analysis cooperation apparatus 1 receives the search result 1209 from the log analysis apparatus 903. The external cooperation unit (search) 1011 outputs the received search result 1209 to the scheduled search unit 1010, as the search result 1115. The scheduled search unit 1010 generates the following message (search result 1116), for example.

<Search Result 1116>

(Message) "An attack 3 on an asset X was detected at 09:00:00 on 2012/09/25".

The attack 3 is information on the attack associated with the attack scenario element 3, and is predicted to occur on the predicted attack occurrence date and time, according to the attack scenario. The asset X is an asset attacked by the attack scenario element 3.

The scheduled search unit 1010 outputs the above message to the output unit 1012, as the search result 1116.

The output unit 1012 displays the search result 1116 on the GUI of the display screen of the log analysis cooperation apparatus 1 or the like, as the search result 1210.

The operator of the log analysis cooperation apparatus 1 for whom this message has been displayed on the GUI may instruct the operator of the log analysis apparatus 903 (in FIG. 3) to perform a detailed log analysis based on the message, using the log analysis apparatus 903, or to prepare a report, or the like.

As described above, in the log analysis cooperation system 1000 according to this embodiment, the following effects are achieved. That is, the log analysis cooperation apparatus 1 (log analysis cooperation system) determines a date and time when a subsequent possible attack is predicted to occur, based on an attack capable of being detected by the SIEM apparatus 902 (SIEM system) and using an attack scenario. Then, the log analysis cooperation apparatus 1 causes the log analysis apparatus 903 (log analysis system) to perform a scheduled search, based on the predicted attack occurrence date and time, thereby allowing an efficient search for a trace of the attack by the log analysis apparatus 903 (log analysis system).

Second Embodiment

In this embodiment, a description will be mainly directed to a difference from the first embodiment.

Figure 9:
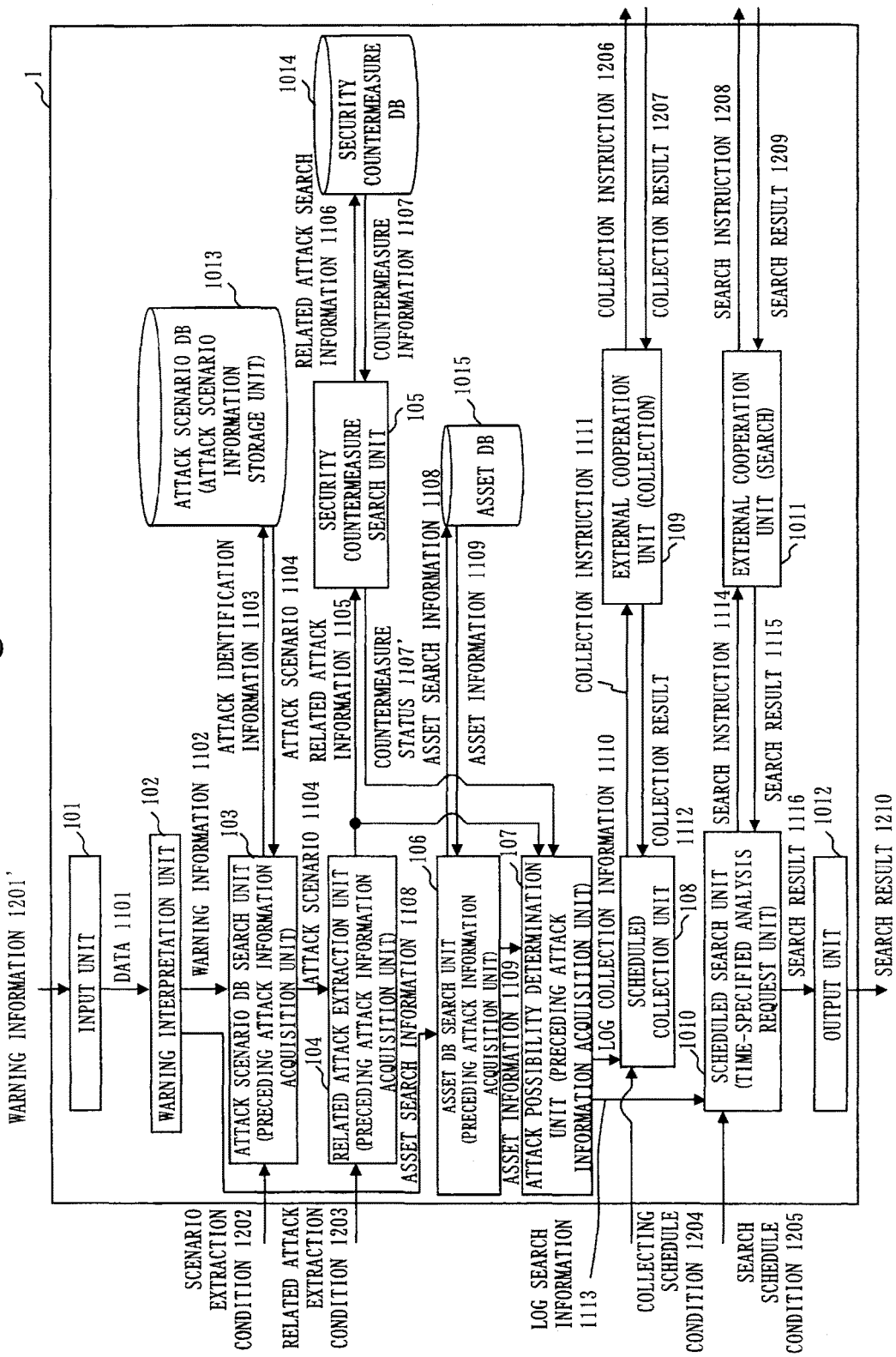
FIG. 9 is a diagram outlining a configuration and operation of the log analysis cooperation apparatus 1 according to a second embodiment.

FIG. 9 is a diagram illustrating a configuration and operation of the log analysis cooperation apparatus 1 according to this embodiment. FIG. 9 is corresponds to FIG. 1. Thus, same reference signs are assigned to functional configurations which are the same as those in FIG. 1, thereby omitting description of the functional configurations.

In this embodiment, an embodiment of a log analysis method when log collection cannot be constantly performed due to a resource constraint, as in the case of the mobile device 905 or the like.

As illustrated in FIG. 9, the difference between the configuration and the operation of the log analysis cooperation apparatus 1 according to this embodiment and those in the first embodiment is that use of the scheduled collection unit 108, the external cooperation unit (collection) 109, and a collecting schedule condition 1204 is added in this embodiment.

Since processes by the input unit 101 to the attack possibility determination unit 107 and each information related to the processes by the input unit 101 to the attack possibility determination unit 107 are the same as those in the first embodiment, description of the processes and the information will be omitted.

The attack possibility determination unit 107 outputs log collection information 1110 to the scheduled collection unit 108 as well as outputs log search information 1113 to the scheduled search unit 1010.

The attack possibility determination unit 107 generates the log collection information 1110 that is information to be described below. It may also be so arranged, for example, that the attack possibility determination unit 107 inputs the collecting schedule condition 1204, and generates the log collection information 1110, based on the input collecting schedule condition 1204.

First, the attack possibility determination unit 107 computes a time at which an attack scenario element 3 is predicted to occur, based on an "interval 2 of 1104_s2" in related attack information 1105. To take an example, when the date and time (attack occurrence date and time) of a notified attack (attack scenario element 2) is "2012/09/24, 09:00:00" in warning information 1201 and the "interval 2 of 1104_s2" is "24 hours", "2012/09/25, 09:00:00" is computed as a predicted attack occurrence date and time.

The attack possibility determination unit 107 generates an instruction (log collection instruction) to collect a log, using the predicted attack occurrence date and time and asset identification information 1109_a in asset information 1109.

The log collection instruction is as follows, for example:
  (a) Collection condition: the predicted attack occurrence date and time
  (b) Search target log: "IP address" or "MAC address" or "asset ID" (all held by the relevant asset)

The attack possibility determination unit 107 generates the log collection instruction as mentioned above, as the log collection information 1110.

The collecting schedule condition 1204 is an additional collection condition such as collecting each log of one hour before and after the predicted attack occurrence date and time, for example. The collecting schedule condition 1204 is a condition further added to the log collection information 1110. In this case, the scheduled collection unit 108 processes the log collection information 1110 as follows:
  (a) Collection condition: one hour plus and minus the predicted attack occurrence date and time
  (b) Search target log: "IP address" or "MAC address" or "Asset ID" (all held by the relevant asset).

When the attack possibility determination unit 107 outputs the log collection information 1110 to the scheduled collection unit 108, the scheduled collection unit 108 converts the log collection information 1110 to a collection instruction 1111 that may be interpreted by the log analysis apparatus 903, and then outputs the collection instruction 1111 to the external cooperation unit (collection) 109.

The external cooperation unit (collection) 109 transmits a collection instruction 1206 to the log analysis apparatus 903 that is present outside the log analysis cooperation apparatus 1. This process corresponds to the scheduled collection 915' at (4)' in FIG. 1.

The log analysis apparatus 903 instructs the logger 901 to execute log collection (scheduled collection) from the relevant asset on the predicted attack occurrence date and time (or for one hour before and after the predicted attack occurrence date and time), according to the received collection instruction 1206. This process corresponds to the scheduled collection 916' at (5)' in FIG. 1.

The logger 901 executes log collection from the mobile device 905 only on the predicted attack occurrence date and time (or for one hour before and after the predicted attack occurrence date and time), according to the scheduled collection. This process corresponds to the scheduled collection 916" at (5)" in FIG. 1 and the log 917" at (6)" in FIG. 1.

The logger 901 notifies a log collection result to the log analysis apparatus 903, as a log 917". The log analysis apparatus 903 transmits the log 917" notified from the logger 901 to the log analysis cooperation apparatus 1, as a collection result 1207.

The external cooperation unit (collection) 109 of the log analysis cooperation apparatus 1 inputs the collection result 1207, and outputs the collection result 1207 to the scheduled collection unit 108, as a collection result 1112.

By the processes as mentioned above by the scheduled collection unit 108, scheduled log collection from the mobile device 905 is performed by the logger 901. After this scheduled log collection, the processes by the scheduled search unit 1010, the external cooperation unit (search) 1011, and the output unit 1012 in the first embodiment are executed.

In this embodiment, the logger 901 includes a log collection function for the mobile device 905. Thus, a structure may be conceived where a log collection agent is installed in the mobile device 905, and the logger 901 transmits a log transmission instruction to the log collection agent of the mobile device 905, thereby transmitting a log of the mobile device 905 to the logger 901. Such a structure should be constructed using an existent technique. The structure for log collection is not limited to an agent method. An agentless method may also be used. Alternatively, a method of directly transmitting the collection instruction 1206 to the logger 901 may be used.

In this embodiment, a log necessary for analysis is collected from a mobile device from which constant log collection is impossible, only if necessary. Thus, there is an effect that log collection may be performed without imposing a burden on the mobile device.

Third Embodiment

In this embodiment, a difference from the first and second embodiments will be mainly described, using FIG. 9.

In the first embodiment, the description has been directed to the case where nothing is specified in the search schedule condition 1205. In this embodiment, a description will be given about an embodiment where the following condition, for example, is specified as a search schedule condition 1205, thereby allowing an increase in search variation.

The scheduled search unit 1010 inputs, as the search schedule condition 1205, a condition specified as a "search from one hour before a predicted attack occurrence date and time to the predicted attack occurrence date and time" or a "search for one hour before and after the predicted attack occurrence date and time".

These specifications are each reflected on a search condition of log search information 1113 by the schedule search unit 1010, so that a search instruction 1114 is generated.

An instruction to further extend a scheduled search when it is proved in a search result 1115 that no entry has been searched for may be specified as the search schedule condition 1205, in advance.

To take an example, the scheduled search unit 1010 inputs the search schedule condition 1205 in which it is specified that "if no entry has been searched for in the search result 1115 of a first search, similar scheduled searches should be performed n times at time intervals of m hours". In this case, the scheduled search unit 1010 generates the search instruction 1114, reflecting the condition of "n times at time intervals of m hours" on the search date and time of the search condition.

Specifically, when it is specified in the search schedule condition 1205 that "if no entry has been searched for in the search result 1115 of the first search, similar scheduled searches should be performed twice at time intervals of one hour", the following scheduled searches (a) to (c) are executed:

(a) The search date and time of the first search: 2012/09/25, 09:00:00;

(b) The search date and time of a second search: 2012/09/25, 10:00:00; and (c) The search date and time of a third search: 2012/09/25, 11:00:00.

When "an attack that has occurred before a notified attack" is specified in a related attack extraction condition 1203, the related attack extraction unit 104 extracts information on the attack that may have occurred before the notified attack, based on an attack scenario 1104. In that case, the search schedule condition 1205 is specified as follows. With this arrangement, the scheduled search unit 1010 (time-specified analysis request unit) may request the log analysis apparatus 903 to perform a search for a trace of the attack that may have occurred before the detected attack, by transmitting the search instruction 1114 (search instruction 1208) to the log analysis apparatus 903.

Assume, for example, that an attack (attack notified by warning information 1201') detected by the SIEM apparatus 902 corresponds to the "attack scenario element 2 of 1104_e2" (refer to FIG. 5). In that case, the "attack scenario element 1 of 1104_e1" (preceding attack) may have occurred on a date and time before the "interval 1 of 1104_s1" (preceding occurrence interval) for the occurrence date and time of the attack of the "attack scenario element 2 of 1104_e2".

Assume that the "interval 1 of 1104_s1" is "24 hours". Using this information, a search date and time that is 24 hours before the date and time (attack occurrence date and time of 2012/09/24, 09:00:00) in the warning information 1201' is specified in the search schedule condition 1205, for example. That is, a "search on 2012/09/23, 09:00:00" is specified in the search schedule condition 1205.

In this case, however, the search at the time already in the past should be performed. Thus, it is instructed that the search be not performed by scheduling and be immediately performed.

A keyword and so forth to be used for the search may be specified in a similar manner to the first embodiment. The keyword and so forth are cited from the attack scenario element 1 of 1104_e1 (attack in a preceding stage).

The attack scenario DB search unit 103, the related attack extraction unit 104, the asset DB search unit 106, and the attack possibility determination unit 107 constitute an example of a preceding attack information acquisition unit.

This embodiment has the following advantage. That is, by specifying the search schedule condition 1205, an allowance may be provided for a search date and time. Further, if no entry has been searched for in a first search, a search method after the first search may be specified. As a result, even if the predicted attack occurrence date and time has deviated, the deviation may be accommodated. Further, an attack scenario is referred to and an attack occurrence date and time and an attack interval are used so as to check from a log a trace of an attack in a stage before a detected attack. Then, a search target time is specified to an appropriate past. The trace of the attack in the past may be thereby searched for from the log.

Fourth Embodiment

In this embodiment, a description will be mainly directed to a difference from the first to third embodiments.

Same reference signs are assigned to functional configurations which are the same as those described in the first to third embodiments, and description of the functional configurations may be thereby omitted.

In this embodiment, a description will be given about a countermeasure when an unauthorized access by spoofing is predicted as an attack. This attack is predicted to occur subsequent to an attack notified by warning information 1201 output from the STEM apparatus 902.

An APT may use an "unauthorized access by spoofing using a password hash". The "unauthorized access by spoofing using a password hash" means an attack that will be described below.

A password hash may be cached on a memory or saved in a file when various authentications are performed. Assume that this password hash is stolen. Then, spoofing may succeed by using only the stolen password hash even if a password itself is not known.

This spoofing abuses a situation in which a lot of authentication methods use a value obtained by converting a password by hashing for authentication. A hacker steals this password hash, and tries to abuse the stolen password hash. In general, however, a malware cannot steal the password hash unless an OS operates with an administrator right.

Then, in this embodiment, a description will be given about a method of detecting and suppressing spoofing that abuses a password hash when an attack of the above-mentioned "unauthorized access by spoofing using a password hash" is predicted to occur.

It is assumed, for example, that the predicted attack (subsequent attack) described in the first embodiment is the "attack scenario element 3 of 1104_e3" and the "unauthorized access by spoofing using a password hash" is defined as follows in the "attack scenario element 3 of 1104_e3".

<Contents of Attack Scenario Element 3 of 1104_e3>
(a) The Attack identification information 1104_a: the "attack ID=1234", the "attack type"=9 (unauthorized access by spoofing using a password hash)", the "vulnerability ID=none";
(b) The attack information 1104_b: the "product to be affected (included as the product ID=OS_○○, the version information=ver1, and the batch ID=1, 2, 3, 4, 5)", the "execution right to be needed=an administrator", the "keyword=none", and the "other information=none";
(c) The countermeasure identification information 1104_c: the "countermeasure ID=1234";
(d) The countermeasure information 1104_d: the "patch ID=none", the "workaround ID=789", the "content of the workaround (stop execution with the administrator right", and the "other information=none".

"9", which is an ID for identifying an "unauthorized access by spoofing using a password hash", is given to the attack type of the "attack identification information 1104_a".

It is also assumed that, in the asset information 1109, the asset execution information 1109_d of the asset X to be attacked is the "administrator".

The administrator right is often needed to perform OS patching and installation of an application, and the OS patching and installation of the application may be executed with the administrator right, giving priority to convenience.

Figure 10:
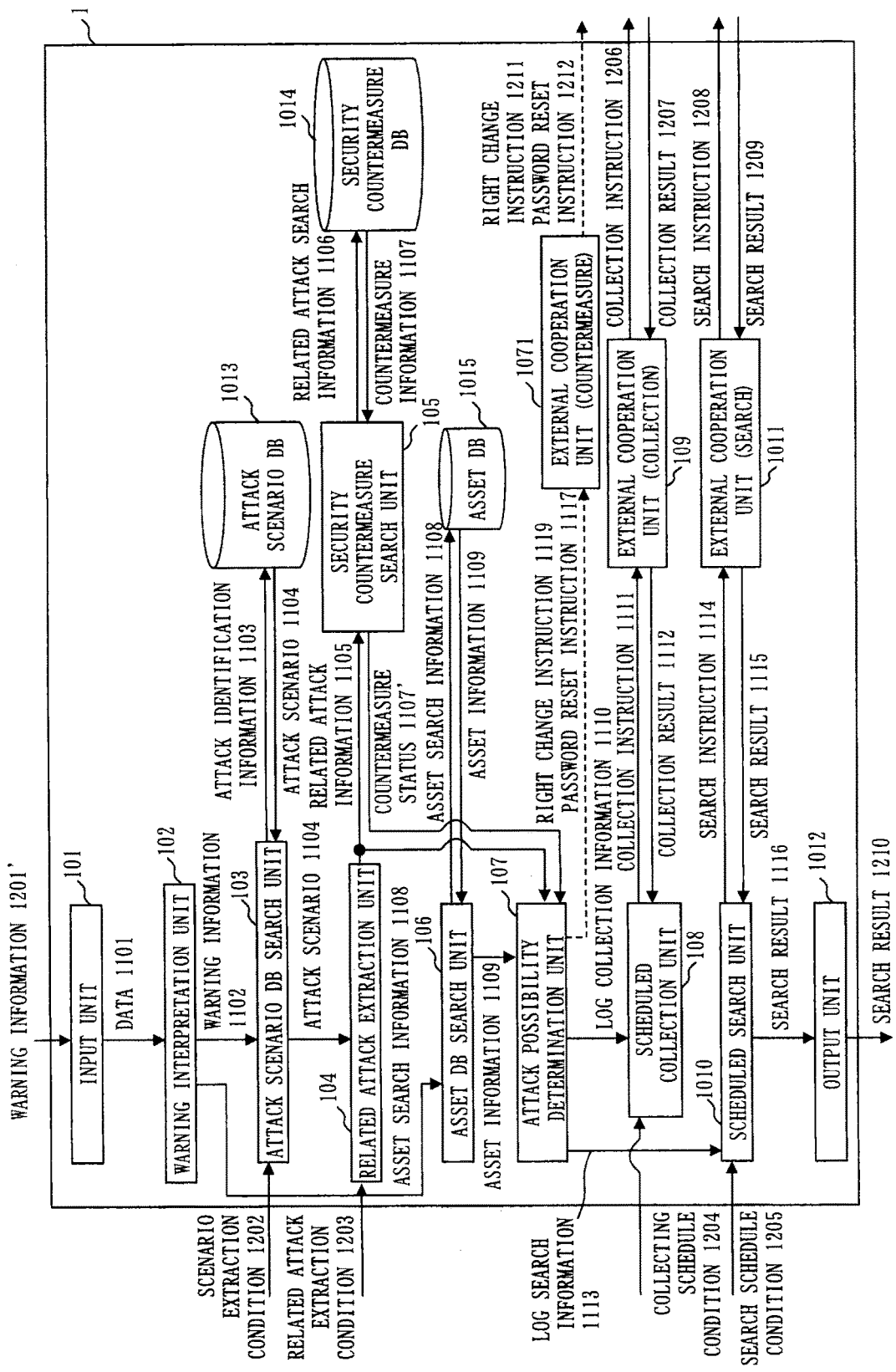
FIG. 10 is a diagram outlining a configuration and operation of the log analysis cooperation apparatus 1 according to a fourth embodiment.

FIG. 10 is a diagram illustrating a configuration and operation of the log analysis cooperation apparatus 1 according to this embodiment. FIG. 10 corresponds to FIG. 9. Thus, same reference signs are assigned to functional configurations which are the same as those in FIG. 9, thereby omitting description of the functional configurations.

FIG. 10 includes an external cooperation unit (countermeasure) 1071, in addition to the configuration in FIG. 9.

Since processes by the input unit 101 to the asset DB search unit 106 are the same as those in FIG. 1, description of the processes will be omitted.

The attack possibility determination unit 107 confirms execution of the asset with the right (of the administrator) needed for the attack in step S107_7 when flows of the attack possibility determination process in FIG. 8 are executed. Thus, a positive determination of YES is obtained in step S107_7. Then, a determination that "the attack is likely to succeed" in step S1078 is obtained.

In addition to the above-mentioned processes, the attack possibility determination unit 107 performs the following processes when the attack type is 9 indicating the "unauthorized access by spoofing using a password hash".

Referring to FIG. 10, the attack possibility determination unit 107 generates the following information and outputs the following information to the external cooperation unit (countermeasure) 1071.
(a) A right change instruction 1119: an instruction to change execution of the asset X to be performed with a right other than the administrator right when the asset X is executed with the administrator right.
(b) A password reset instruction 1117: an instruction to change the password of the administrator of the asset X.

The external cooperation unit (countermeasure) 1071 inputs the right change instruction 1119 and the password reset instruction 1117 from the attack possibility determination unit 107. The external cooperation unit (countermeasure) 1071 converts the input right change instruction 1119 to a right change instruction 1211, and also changes the input password reset instruction 1117 to a password reset instruction 1212. Then, the external cooperation unit (countermeasure) 1071 outputs the right change instruction 1211 and the password reset instruction 1212 to an outside of the log analysis cooperation apparatus 1.

A monitor target system includes an authentication server 10 (or a management system similar to the authentication server) (authentication apparatus). The authentication server 10 authenticates an access right for each of the monitor target system, the communication device 904 connected to the monitor target system, the mobile device 905, and so forth, using authentication information. The authentication information is a user ID, a password, or the like, for example.

The external cooperation unit (countermeasure) 1071 transmits the right change instruction 1211 and the password reset instruction 1212 to the authentication server 10 that manages the overall system.

Figure 11:
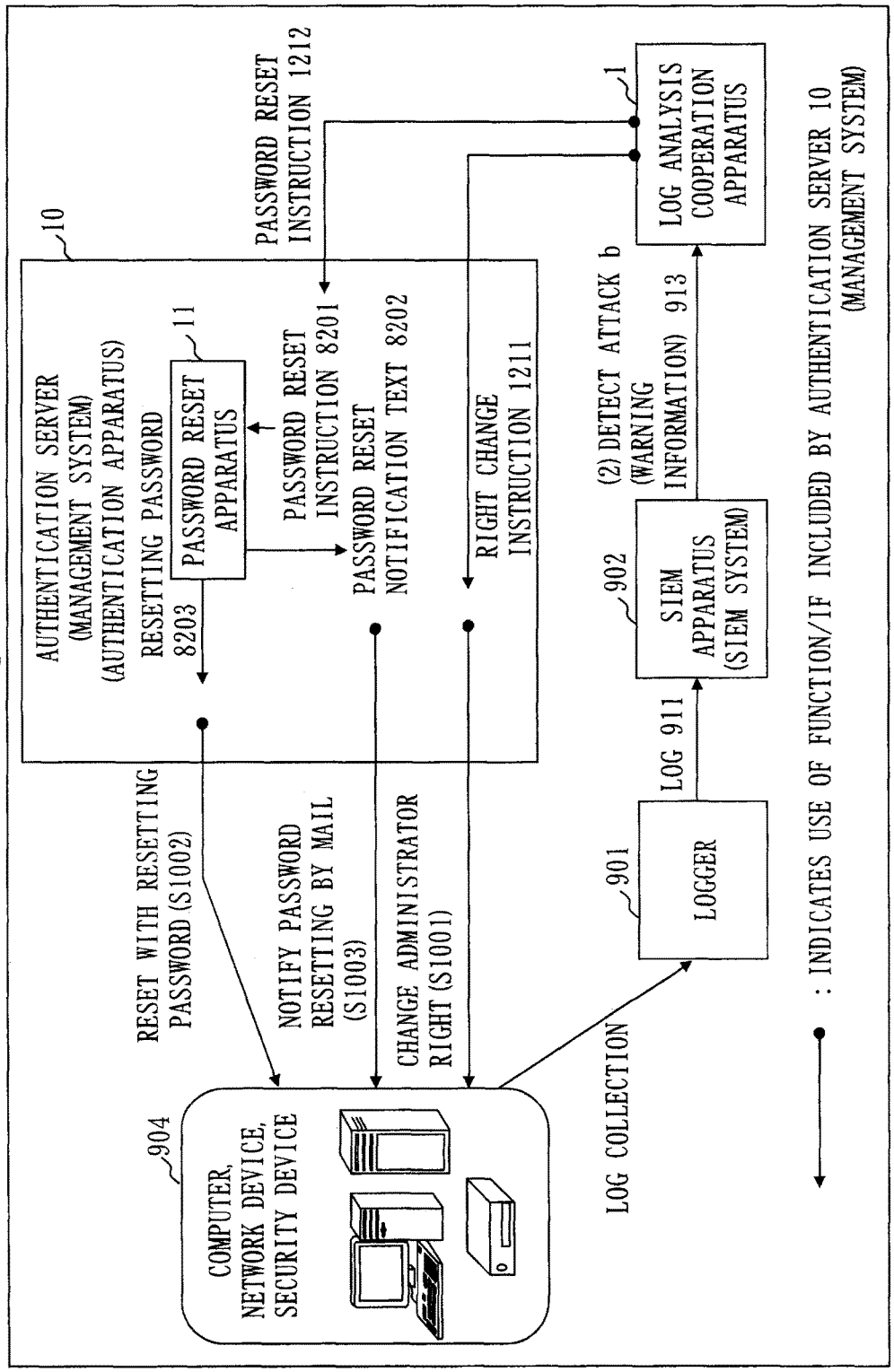
FIG. 11 is a diagram illustrating a configuration and operation of an authentication server 10 according to the fourth embodiment.

FIG. 11 is a diagram illustrating a configuration and operation of the authentication server 10 according to this embodiment.

As illustrated in FIG. 11, upon receipt of the right change instruction 1211 from the log analysis cooperation apparatus 1, the authentication server 10 changes the execution right of the relevant asset to the right other than that of the administrator (in step S1001). The authentication server 10 includes a right changing function of changing the execution right of the relevant asset to the right other than that of the administrator according to the input right change instruction 1211.

As illustrated in FIG. 11, the authentication server 10 also includes a password reset apparatus 11. The authentication server 10 inputs the password reset instruction 1212 from the log analysis cooperation apparatus 1, converts the input password reset instruction 1212 to a password reset instruction 8201, and then inputs the password reset instruction 8201 to the password reset apparatus 11.

When inputting the password reset instruction 8201, the password reset apparatus 11 generates a resetting password 8203 and a password reset notification text 8202 for resetting the password of the communication device 904. The password reset apparatus 11 transmits the resetting password 8203 and the password reset notification text 8202 to the communication device 904 or the like (in steps S1002 and S1003). Details of the process of generating the resetting password 8203 and the password reset notification text 8202 will be described later.

The external cooperation unit (countermeasure) 1071 of the log analysis cooperation apparatus 1 converts the right change instruction 1119 to the right change instruction 1211 to be interpreted by the above-mentioned right changing function. Similarly, the external cooperation unit (countermeasure) 1071 converts the password reset instruction 1117 to the password reset instruction 1212 to be interpreted by a password reset function.

For each of the right changing function and the password reset function as mentioned above, a software development library is often provided, or an instruction format or a communication method is often disclosed, for example.

The right change instruction 1211 is transmitted from the external cooperation unit (countermeasure) 1071 to the authentication server 10 (or the similar management system). The authentication server 10 changes the execution right of the asset X, using the right change function.

Next, the external cooperation unit (countermeasure) 1071 transmits the password reset instruction 1212 to the authentication server 10 (or the similar management system).

In this case, the authentication server 10 (or the similar management system) calls a module including the password resetting function, according to this password reset instruction 1212.

Now, a process by the module to be called by the authentication server 10 (or the similar management system) upon receipt of the password reset instruction 1212 will be depicted below.

The module resets the password of the administrator of the asset X by the resetting password to be given below, and then notifies a password after the resetting to a user using the text to be described below.

The password of the relevant asset is reset, using the password reset function to be remotely executed from the authentication server 10 (or the similar management system).

The password reset apparatus 11 according to this embodiment includes a password generation function for performing password resetting and a password reset notifying function for notifying a password after the resetting.

The password reset apparatus 11 executes, for the password resetting, the following processes of:
(1) generating a "pass_1" as a safe password;
(2) applying a conversion method provided in advance to the generated password to generate a new password "pass_2";
(3) resetting the password of the administrator of the relevant asset, using the password "pass_2" obtained by the conversion; and
(4) transmitting an electronic mail indicating the "pass_1" and the "method applied in (2)" to the user of the asset X.

When the attack of the "unauthorized access by spoofing using a password hash" is predicted, automatic password resetting is performed by the monitor target system or a monitor target apparatus using the processes as mentioned above, and the password obtained after the resetting is notified to the user by an electronic mail or the like.

Figure 12:
FIG. 12 includes diagrams each illustrating an example of an electronic mail generated by a password reset apparatus 11 according to the fourth embodiment.

(a) and (b) of FIG. 12 are diagrams each illustrating an example of the electronic mail to be generated by the password reset apparatus 11 in this embodiment. (a) of FIG. 12 is the diagram illustrating the example of the electronic mail, while (b) of FIG. 12 is the diagram illustrating another example of the electronic mail.

"J9-n1*%4>^q" illustrated in (a) of FIG. 12 is the password "pass_1". Then, "!J9-n1*%4>^q)" is the password "pass_2".

As illustrated in (a) of FIG. 12, the method of converting the password "pass_1" to the password "pass_2" ("conversion method applied in (2)") is instructed by the text of the mail that says "add '!' to just before the following password and add ')' to the end of the following password to input as a password".

Figure 13:
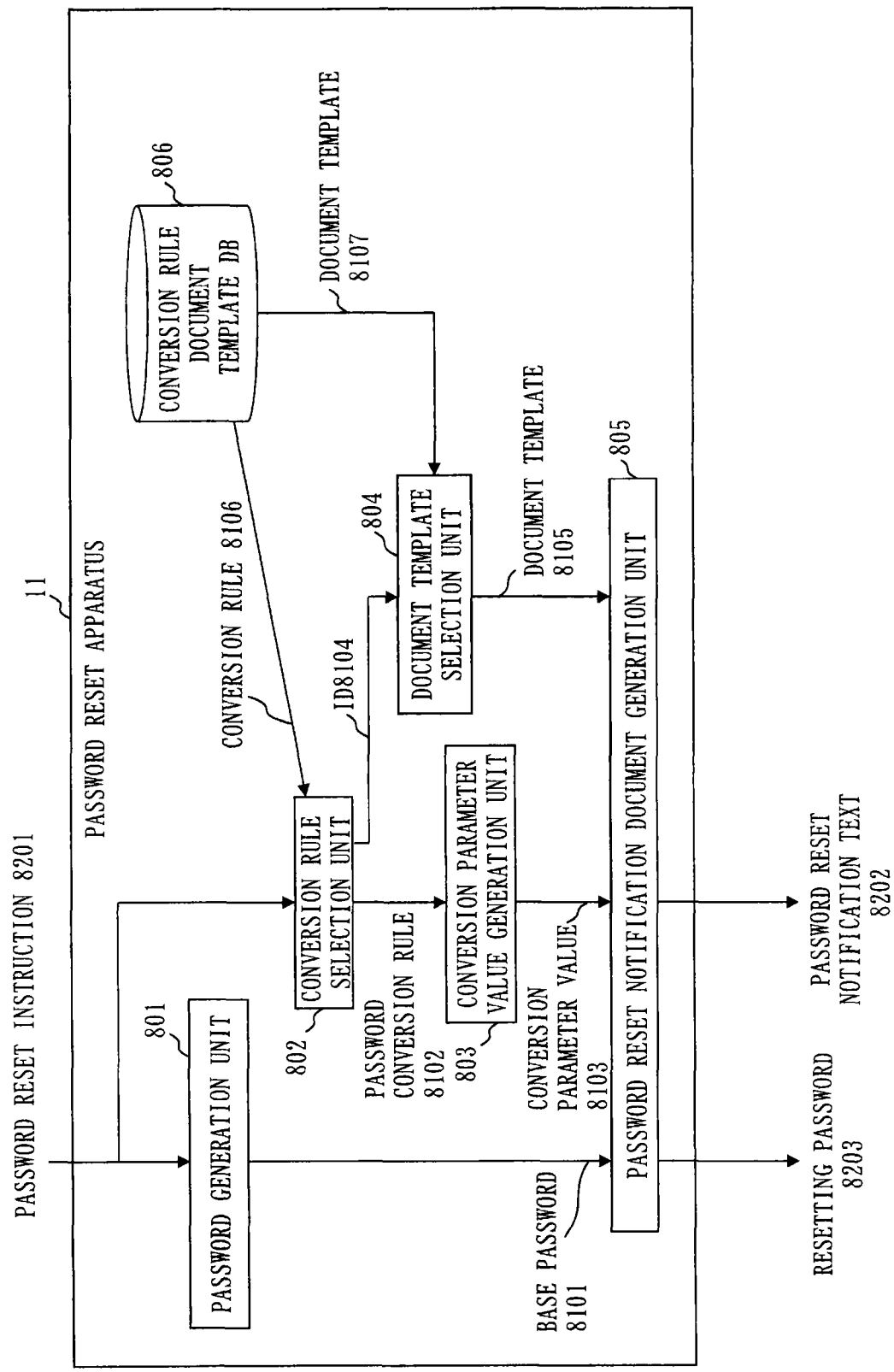
FIG. 13 is a diagram illustrating a configuration and operation of the password reset apparatus 11 according to the fourth embodiment.

FIG. 13 is a diagram illustrating a configuration and operation of the password reset apparatus 11 according to this embodiment.

The text for resetting the password depicted in (a) of FIG. 12 is generated by the password reset apparatus 11 illustrated in FIG. 13.

The password reset apparatus 11 includes a password generation unit 801, a conversion rule selection unit 802, a conversion parameter value generation unit 803, a document template selection unit 804, a password reset notification document generation unit 805, and a conversion rule document template DB 806.

The password generation unit 801 generates a safe password.

The conversion rule selection unit 802 selects a rule for converting the password generated by the password generation unit 801. The conversion rule selection unit 802 searches the conversion rule document template DB 806 for the rule for conversion and obtains the rule for conversion.

The conversion parameter value generation unit 803 generates a parameter for conversion to be used when the password is converted.

The document template selection unit 804 searches the conversion rule document temperature DB 806 for a document template to form a pair with the rule for conversion of the password, and obtains the document template.

The password reset notification document generation unit 805 generates a document for instructing password resetting, and outputs the password reset notification text 8202 and the resetting password 8203.

Figure 14:
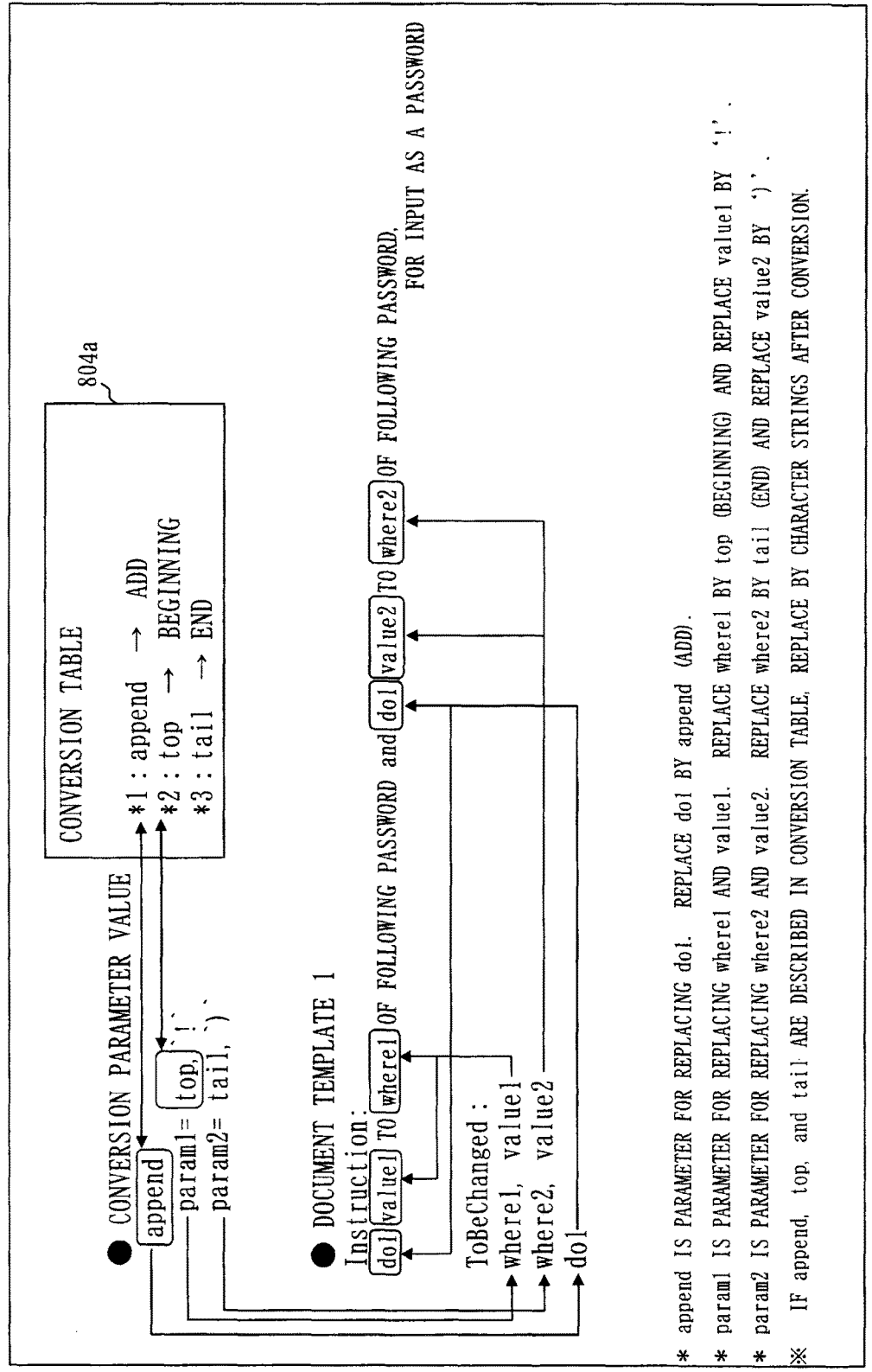
FIG. 14 is a diagram illustrating a method of generating a resetting password 8203 and a password reset notification text 8202 by the password reset apparatus 11 according to the fourth embodiment.

The conversion rule document template DB 806 is a DB where each pair of the rule for conversion of the password and the document template is stored. The pair of the rule for conversion of the password and the document template (hereinafter described as a password conversion rule+document template) is stored and managed as follows, using an ID for identifying this pair:

ID1: a password conversion rule 1+document template 1
ID2: a password conversion rule 2+document template 2
. . .
IDn: a password conversion rule n+document template n FIG. 14 is a diagram illustrating a method of generating the resetting password 8203 and the password reset notification text 8202 by the password reset apparatus 11 according to this embodiment.

The operation of the password reset apparatus 11 will be described, using FIGS. 13 and 14.

The password reset apparatus 11 inputs the password reset instruction 8201 (the instruction for the authentication server 10 (or the similar management system)). The input password reset instruction 8201 is input to the password generation unit 801 and the conversion rule selection unit 802.

The password generation unit 801 generates the safe password using a predetermined algorithm, as a base password 8101.

The conversion rule selection unit 802 randomly selects the ID that manages the pair of the password conversion rule+document template. To take an example, the conversion rule selection unit 802 selects the "ID1". Then, the conversion rule selection unit 802 transmits the selected "ID1" to the conversion rule document template DB 806 to obtain a conversion rule 8106 for a corresponding entry.

Herein, the conversion rule selection unit 802 obtains the password conversion rule 1 from the entry corresponding to the "ID1" as follows.

The ID1: the password conversion rule 1+document template 1

The conversion rule selection unit 802 outputs the password conversion rule 1 to the conversion parameter value generation unit 803 as a password conversion rule 8102.

It is assumed herein that the password conversion rule 1 is described as follows:
<password conversion rule 1>
append
 param1=top, '!'
 param2=tail, ')'

Next, the conversion parameter value generation unit 803 interprets this password conversion rule 1 to generate a conversion parameter value 8103 as follows (refer to FIG. 14).
append
 param1=top, '!'
 param2=tail, ')'

Herein, the values are already specified in the param1 and the param2. Thus, the conversion parameter value generation unit 803 outputs the password conversion rule 1 without alteration, as the conversion parameter value 8103.

When the values are not set in the parameters, the conversion parameter value generation unit 803 sets the values in the parameters to generate the parameter value 8103.

The conversion parameter value 8103 when the values are not set in the parameters is as follows:

append
 param1=top, *
 param2=tail, *

Assume that the conversion parameter value 8103 when the values are not set in the parameters is specified as mentioned above. Then, the conversion parameter value generation unit 803 selects and applies arbitrary characters on the spot. The arbitrary character is applied to each "*".

When the conversion parameter value generation unit 803 selects ']' and '>', for example, the password conversion rule 1 is interpreted as follows:
append
 param1=top, ']'
 param2=tail, '>'. The number of characters should be one or more characters.

In this case, the resetting password becomes "]J9-n1*%4>^q>".

Next, the conversion rule selection unit 802 outputs the selected "ID1" to the document template selection unit 804 as an ID8104.

The document template selection unit 804 inputs the ID8104 (ID1) from the conversion rule selection unit 802. The document template selection unit 804 searches the conversion rule document template DB 806, using the input ID 8104 (ID1). The document template selection unit 804 obtains the document template 1 corresponding to the ID8104 (ID1), as a document template 8107. Further, the document template selection unit 804 outputs the obtained document template 1 to the password reset notification document generation unit 805.

It is assumed herein that the document template 1 is described as follows (refer to FIG. 14):
<Document Template 1>
Instruction:
Do1 value1 to where1 of the following password and do1 value2 to where2 of the following password, for input as a password.
ToBeChanged:
where1, value1
where2, value2
do1

The password reset notification document generation unit 805 refers to the input conversion parameter value 8103.
<Conversion Parameter Value 8103>
append
 param1=top, '!'
 param2=tail, ')'

Herein, it is assumed that the password reset notification document generation unit 805 includes a conversion table 804a illustrated in FIG. 14.

The conversion table 804a describes a correspondence between a variable in a where position and conversion in a document, for example. The conversion table 804a describes the following contents, for example:

(a) top→beginning: the top is converted to the beginning (indicated by *2 in FIG. 14)
(b) tail→end: the tail is converted to the end (indicated by *3 in FIG. 14)

In addition to the above-mentioned contents, the following contents and so forth are specified (without illustration), for example:

(c) 1→first from the beginning: 1 means the first from the beginning
(d) 2→second from the beginning: 2 means the second from the beginning.

The password reset notification document generation unit 805 interprets the above-mentioned conversion parameter value 8103 as follows, based on the conversion table 804*a*, for example:

(1) Since append is instructed, the specified values are added to the specified locations.

<Specified Values>
  a first specified value of '!' based on the param1
  a second specified value of ')' based on the param2

<Specified Locations>
  a first specified location of top→beginning based on the param1
  a second specified location of tail→end based on the param2

Then, the password reset notification document generation unit 805 generates the resetting password as follows:

(1) the resetting password of "!J9-n1*%4>^q)" for the base password 8101 (J9-n1*%4>^q).

This resetting password is obtained by adding '!' to the beginning of "J9-n1*%4>^q" and adding ')' to the end of "J9-n1*%4>^q".

Next, the password reset notification document generation unit 805 refers to the input document template 8105 (document template 1) and interprets the input document template 8105 as follows:

(1) Instruction: read the following character strings to interpret as a document that instructs password conversion.

Do1 value1 to where1 of the following password and do1 value2 to where2 of the following password, for input as a password.

(2) Identify locations ToBeChanged: and load one line by one line.

(where1, value1), (where2, value2), (do1) are obtained.

Then, the password reset notification document generation unit 805 interprets the following:

In the document that instructs the password conversion of "Do1 value1 in where1 of the following password and do1 value2 in where2 of the following password, for input as a password",
  replace a portion matching the 'where1' by a character string indicating a first converting portion;
  replace a portion matching the 'value1' by a first converting value;
  replace a portion matching the 'where2' by a character string indicating a second converting portion;
  replace a portion matching the 'value2' by a second converting value; and
  replace a portion matching 'do1' by a character string indicating a conversion method.

Next, the password reset notification document generation unit 805 refers to the conversion parameter value 8103.
  append
    param1=top, '!'
    param2=tail, ')'.

This conversion parameter value 8103 is already interpreted as follows:

(1) Since append is used, add a specified value to each specified portion.

<Specified Values>
  the first specified value of '!' based on the param1
  the second specified value of ')' based on the param2

<Specified Locations>
  the first specified location of top→beginning based on the param1
  the second specified location of tail→end based on the param2

Using the above-mentioned data, the password reset notification document generation unit 805 performs the following conversions:
  replacement of the portion matching the 'where1' by the character string indicating the first converting portion→'beginning'
  replacement of the portion matching the 'value1' by the first converting value→'!'

As a result, the document that indicates the password conversion (hereinafter referred to as a conversion instruction document) is converted as follows:

Conversion instruction document: "do1 '!' to the beginning of the following password and do1 value2 to where2 of the following password, for input as a password".

Herein, the "beginning" and the "'!'" are converted portions.

Similarly, the password reset notification document generation unit 805 performs the following conversions:
  replacement of the portion matching the 'where2' by the character string indicating the second converting portion 'end'
  replacement of the portion matching the 'value2' by the second converting value→')'

As a result, the conversion instruction document for the password is converted as follows:

Conversion instruction document: "do1 the '!' to the beginning of the following password and do1 the ')' to the end of the following password, for input as a password".

Herein, the "end" and the "')'" are converted portions.

Finally, the password reset notification document generation unit 805 performs the following conversion:
  replace the portion of do1 by "append→'add'" that is a conversion instruction.

As a result, the password conversion instruction document is converted as follows:

Conversion instruction document: "add the '!' to the beginning of the following password and add the ')' to the end of the following password, for input as a password".

Herein, each "add" is a converted portion.

Finally, the password reset notification document generation unit 805 adds the base password 8101 to the end of the conversion instruction document to generate a password reset document (conversion instruction document) in the end as follows (refer to (a) of FIG. 12).

Conversion instruction document: Add '!' to just before the following password and add ')' to the end of the following password, for input as a password.
J9-n1*%4>^q Then, the password reset notification document generation unit 805 outputs the password reset document (conversion instruction document) as the password reset notification text 8202. The password reset notification document generation unit 805 also outputs the resetting password 8203.

The authentication server 10 (or the similar management system) resets the password for the administrator of the asset X, using the resetting password 8203 that is an output of the password reset apparatus 11 (in step S1002 in FIG. 11).

Further, the authentication server 10 (or the similar management system) receives the password reset notification text 8202 that is an output of the password reset apparatus 11 sets the password reset notification text 8202 as the text of an electronic mail, and then transmits the electronic mail to the user of the asset X (in step S1003 in FIG. 11).

Upon receipt of this electronic mail, the user of the asset X reads the text of the mail, obeys the instruction, and then inputs the resetting password as a password after resetting.

Then, the user himself may further reset the password.

Next, another implementation method of the password reset process by the password reset apparatus 11 will be described.

As illustrated in (b) of FIG. 12, there is a method of generating a text as follows, as the password reset notification text 8202.

The text of a mail illustrated in (b) of FIG. 12 is as follows:

"Select the number for an animal matching an image, and add the name of the animal to the end of the following password, for set as a password."

Then, the base password of "J9-n1*%4>^q" is displayed. Further, the image of fish is added. Then, options of "1. tiger, 2. snake, 3. fish, 4. Michel" are displayed. The positions of the image of the fish and the options may be reversed.

In this case, the conversion rule document template DB 806 manages the following:

ID 1: a password conversion rule g+document template g+image template g.

The password conversion rule g has the following content:

<Password Conversion Rule g>
append
  param1=tail, 'fish".

The document template g has the following contents:
<Document Template g>
Instruction:
Select the number for an animal matching an image and do1 the name of the animal to where1 of the following password, for set as a password. ToBeChanged:
where1←value1 is none
do1

The image template g has the following contents:
<Image Template g>
"image of fish"
"1. tiger, 2. snake, 3. fish, 4. Michel".

Processes by the password generation unit 801, the conversion rule selection unit 802, and the conversion parameter value generation unit 803 are the same as those when the mail in (a) of FIG. 12 is generated.

The document template selection unit 804 obtains the image template g as well as the document template g, and outputs the image template g and the document template g to the password reset notification document generation unit 805.

As in the above-mentioned process, the password reset notification document generation unit 805 generates the password reset notification text 8202 (conversion instruction document) in the following manner. The value1 ToBeChanged is not present in the document template g, and there is no portion in the document of the Instruction corresponding to the value1. Thus, no process related to replacement using this value1 is performed.

The password reset notification document generation unit 805 adds the base password of "J9-n1*%4>^q" to the conversion instruction document of "Select the number for an animal matching an image and add the name of the animal to the end of the following password, for set as a password".

Next, the password reset notification document generation unit 805 adds '1. tiger, 2. snake, 3. fish, 4. Michel' in the image template g to the end of the text.

Further, the password reset notification document generation unit 805 adds the image of fish to the password reset notification text 8202.

The password reset notification document generation unit 805 generates the password reset notification text 8202 in the above-mentioned manner. The password reset notification document generation unit 805 generates "J9-n1*%4>^qfish" as the resetting password 8203, according to the rule.

The above description has been given about an example of implementation. Various password generation methods may be conceived. These methods include changing implementation of a password conversion rule or a document template, changing a method of replacing a base password, deleting a character, or halving a base password and interchanging the halved base passwords.

As described above, it has been described that the log analysis cooperation system 1000 according to this embodiment has the following features.

When an unauthorized access using a password hash is included in information on an attack that may occur in the future, the log analysis cooperation apparatus outputs to an authentication system an instruction to change execution of an asset with an administrator right to execution with a different right.

Further, the log analysis cooperation apparatus generates a new password for an administrator using an apparatus that adds on the existent authentication system, and resets the password of the asset by the new password for the administrator, using the authentication system. Further, the authentication system notifies to the user of the asset a sentence notifying the reset password by a mail. In that case, the sentence of the mail has content indicating a "base password", a "method (document) for converting the base password", and "a password obtained by applying the method depicted in writing to the base password being the password used for resetting".

The feature of the above-mentioned password generation method is that "the password generation method is not known unless a human reads the document". A malware cannot interpret the conversion rule in the password reset notification text 8202 even if the malware receives the mail including the password reset notification document 8202. Thus, the above-mentioned password generation method prevents the malware from abusing the resetting password by the malware.

As described above, the log analysis cooperation system 1000 has the following effect. That is, when an unauthorized access by spoofing using a password hash is determined to occur in the future in an attack scenario, it is checked whether the execution right of an asset targeted for the attack is an administrator right, based on asset information, and the execution right is set to a right other than the administrator right through the authentication server when the asset is executed with the administrator right. The password hash is thereby prevented from being stolen by the malware and being abused for spoofing.

Further, in the log analysis cooperation system 1000 according to this embodiment, the password of the user (administrator) of an asset targeted for an attack is forcibly reset in order to prevent spoofing. Then, when the reset password is notified to the user (administrator) of the asset targeted for the attack by a mail, it is so arranged that the reset password cannot be figured out unless a human understands a sentence. Thus, there is an effect that even if the malware obtains the mail notifying the password, the malware does not identify the password, so that the malware cannot abuse the password.

Fifth Embodiment

In this embodiment, a description will be mainly directed to a difference from the first to fourth embodiments.

Same reference signs are assigned to functional configurations which are the same as those described in the first to fourth embodiments, and description of the functional configurations may be thereby omitted.

In the first to fourth embodiments, the description has been directed to the method of searching from a log occurrence of an attack that may occur in the future at a time at which the attack is predicted to occur, or searching from a log a trace of an attack that could have occurred in the past at a time at which the attack would have occurred, based on an attack scenario including an attack notified by warning information.

Even if the log is searched by specifying the time at which the attack is predicted to occur or the time at which the attack would have occurred, a trace of the attack may not be searched for, for instance.

In this embodiment, a description will be given about a process in which the log analysis cooperation apparatus 1 modifies an attack scenario 1104 to generate a modified scenario when a searched entry is determined not to be present.

Assume that the searched entry is determined not to be present in the search result 1209 in FIG. 3. Then, the log analysis cooperation apparatus 1 generates the modified scenario in which the attack for which the search has been requested to the log analysis apparatus 903 is deleted from the attack scenario 1104 referred to at the time of the search, and then adds the modified scenario to the attack scenario DB 1013.

A description will be given about a case where a trace of the "attack scenario element 3 of 1104_e3" has not been found even if scheduled log search is performed based on the attack scenario 1104 in FIG. 5. In this case, the log analysis cooperation apparatus 1 deletes the "attack scenario element 3 of 1104_e3" from the attack scenario 1104 to generate a new attack scenario 1104'.

The new attack scenario 1104' has the following content:

The attack scenario 1104': "1104_e1: the attack scenario element 1→1104_s1: the interval 1→1104_e2: the attack scenario element 2".

The log analysis cooperation apparatus 1 adds the newly generated attack scenario 1104' to the attack scenario DB 1013, as an additional scenario.

A description will also be given about a case where a time at which an attack based on the value of the "interval 2 of 21104_s2" is predicted to occur is advanced or delayed from a time obtained by an actual search by the log analysis system.

The log analysis cooperation apparatus 1 may reflect (modify) a deviation between the predicted attack occurrence time and the actual attack occurrence time on the "interval 2 of 1104_s2" to modify the attack scenario 1104. To take an example, information of "the interval 2 of 1104_s2=24 hours" before the modification may be set to the "interval 2 of 1104_s2=48 hours" as a result of the modification reflecting the deviation (such as the deviation of 24 hours) between the predicted attack occurrence time and the actual attack occurrence time.

Alternatively, the modification may be made by taking into consideration the deviation (such as the deviation of 24 hours) between the predicted attack occurrence time and the actual attack occurrence time. In this case, the information of the "interval 2 of 1104_s2=24 hours" before the modification may be set to "the interval 2 of 1104_s2=24-48 hours" as a result of the modification reflecting the deviation (such as the deviation of 24 hours) between the predicted attack occurrence time and the actual attack occurrence time.

As mentioned above, according to the log analysis cooperation system 1000 in this embodiment, a deviation between a predicted attack occurrence time and an actual attack occurrence time may be reflected on an attack scenario. Thus, scheduled search with a high accuracy may be executed.

Sixth Embodiment

In this embodiment, a description will be mainly directed to a difference from the first to fifth embodiments.

Same reference signs are assigned to functional configurations which are the same as those described in the first to fifth embodiments, and description of the functional configurations may be thereby omitted.

Information on an attack interval may be unknown, depending on the type of an attack.

In this embodiment, a description will be given about operation of the log analysis cooperation system 1000 using an attack scenario 1104 including no intervals.

In the attack scenario 1104 in FIG. 5, the interval 1 of 1104_s1 and the interval 2 of 1104_s2 are described. In this embodiment, the attack scenario 1104 not including an occurrence interval between the attacks such as the interval 1 or the interval 2 is used.

In other words, the attack scenario 1104 in this embodiment is as follows:

the attack scenario element 1: 1104_e1 the attack scenario element 2: 1104_e2→the attack scenario element 3: 1104_e3.

A description will be given below about a difference between the operation of the log analysis cooperation apparatus 1 in the first embodiment and the operation of the log analysis cooperation apparatus 1 in this embodiment.

In this embodiment, no intervals are included in the attack scenario. Thus, the "attack scenario element 3 of 1104_e3" corresponds to related attack information 1105.

In the first embodiment, the predicted attack occurrence date and time included in the log search information 1113 is generated, using the interval 2 included in the related attack information 1105. In this embodiment, however, there is no information on an "interval". The log analysis cooperation apparatus 1 in this embodiment gives the following instructions in a search schedule condition 1205, for example, in place of the information on the "interval".

<Specific Examples of Search Schedule Condition 1205 According to this Embodiment>

Example 1

"Perform n-time searches from an attack occurrence date and time at intervals of m hours, each for a period of p hours".

Example 2

"Perform a first search from the attack occurrence date and time, perform a second search for a period of p1 hours after a period of 1×m hours from the first search, perform a third search for a period of p2 hours after a period of 2×m hours from the second search, perform a fourth search for a period of p3 hours after a period of 3×m hours from the third search . . . , and then perform n-time searches in a similar way". In the Example 2, a period between two successive searches gradually increases after each search.

Example 3: "Perform a first search from the attack occurrence date and time, perform a second search for a period of p1 hours after a period of 1×m hours from the first search, perform a third search for a period of p2 hours after a period of 2×m hours from the second search, perform a fourth search for a period of p3 hours after a period of 4×m hours from the third search . . . , and then perform n-time searches in a similar way". In the Example 3, a period between two successive searches doubles after each search.

The values of p1, p2, and p3 may be the same or different.

Further, a portion of the condition of "from an attack occurrence date and time" may also be rewritten to "from a current time", "from p hours from now", or "from subsequent 0 o'clock"

The scheduled search unit 1010 receives information on a time, a period of time, and the number of times for performing scheduled searches as the search schedule condition 1205, and generates a search instruction 1114.

A predicted attack occurrence date and time is generated, based on the search schedule condition 1205. When a condition of "intervals of m hours from an attack occurrence date and time" is included in the search schedule condition 1205, for example, the predicted attack occurrence date and time is set to a date and time "after the attack occurrence date and time+m hours" (after which subsequent predicted attack occurrence dates and times are set at intervals of m hours).

In this embodiment, the predicted attack occurrence date and time is not generated by the attack possibility determination unit 107, and is generated by the scheduled search unit 1010. Accordingly, though the date and time for a search was included, as a search condition, in the log search information 1113 to be output by the attack possibility determination unit 107 in the first embodiment, the date and time for a search is not included in the log search information 1113 in this embodiment, and is generated and added by the scheduled search unit 1010.

In the second embodiment, the attack possibility determination unit 107 generates the log collection information 1110. This log collection information 1110 includes a collection condition based on a predicted attack occurrence date and time, as the collection condition. This predicted attack occurrence date and time is computed, based on an interval included in an attack scenario.

Meanwhile, in this embodiment, a predicted attack occurrence date and time is generated by the scheduled collection unit 108, based on a collecting schedule condition 1204. In this case, the collecting schedule condition 1204 is described in a similar manner to the search schedule condition 1205 in this embodiment (description of "search" is replaced by "collect").

Alternatively, the search schedule condition 1205 in this embodiment may be input to the attach possibility determination unit 107, and then the attack possibility determination unit 107 may compute a predicted attack occurrence date and time for each search, using the search schedule condition 1205.

Alternatively, the collecting schedule condition 1204 in this embodiment may be input to the attack possibility determination unit 107, and then the attack possibility determination unit 107 may compute a predicted attack occurrence date and time for each collection, using the collecting schedule condition 1204.

In the above-mentioned examples, the attack occurrence date and time is set to occur in the future. When performing log collection or searching for an attack that would have been occurred in the past by going back to the past, m (hours) may be specified to a minus value.

This embodiment has indicated the case where the attack scenario element included in the related attack information 1105 is the "attack scenario element 3 of 1104_e3".

However, the attack scenario 1104 that has been searched may be as follows, and the number of attack scenario elements included in the related attack information 1105 may be plural, for example.

The attack scenario 1104 that has been searched: "the attack scenario element 1 of 1104_e1→the attack scenario element 2 of 1104_e2→the attack scenario element 3 of 1104_e3→an attack scenario element 4 of 1104_e4 an attack scenario element 5 of 1104_e5".

The attack scenario elements included in the related attack information 1105: "the attack scenario element 3 of 1104_e3, the attack scenario element 4 of 1104_e4, and the attack scenario element 5 of 1104_e5".

That is, the foregoing description is directed to the case where of the number of attack scenario elements included in the related attack information 1105 is plural.

In this case, the attack possibility determination unit 107, the scheduled search unit 1010, and the scheduled collection unit 108 may perform processes with respect to each of these attack scenario elements similar to the processes with respect to the above-mentioned attack scenario element 3 of 1104_e3.

An example of the processes will be given below.

Since the plurality of attack scenario elements are included in the related attack information 1105, countermeasure information 1107 and a countermeasure status 1107' associated with each attack scenario element are responded by the security countermeasure search unit 105.

The attack possibility determination unit 107 determines whether an attack included in each attack scenario element is likely to occur on an asset indicated by asset information 1109 associated with the attack scenario element, according to FIG. 8.

The scheduled search unit 1010 executes log search for the attack scenario element determined to occur on the asset indicated by the associated asset information 1109 by the processes in FIG. 8.

Next, a description will be given about a case where attacks respectively included in the attack scenario element 3 of 1104_e3, the attack scenario element 4 of 1104_e4, and the attack scenario element 5 of 1104_e5 have been each determined to occur on an asset indicated by the associated asset information 1109.

First, the attack corresponding to the attack scenario element 3 of 1104_e3 is searched for from a log by the scheduled search unit 1010. Then, the scheduled search unit 1010 further performs scheduled search with respect to the attack scenario element 4 of 1104_e4 by applying a time, a period of time, and the number of times for performing the scheduled search included in the search schedule condition 1205, to an occurrence date and time of the attack corresponding to the attack scenario element 3 of 1104_e3 recorded in the log, set as an attack occurrence date and time.

Next, when the attack scenario element 4 of 1104_e4 is searched for from a log, the scheduled search unit 1010 further performs scheduled search with respect to the attack scenario element 5 of 1104_e5 by applying a time, a period of time, and the number of times for performing the scheduled search included in the search schedule condition 1205, to an occurrence date and time of the attack corresponding to the attack scenario element 4 of 1104_e4 recorded in the log, set as an attack occurrence date and time.

The scheduled search unit 1010 may output a search result 1116 to the output unit 1012 whenever each attack scenario element is searched for from the log, or may collectively output all search results when the attack scenario element 5 of 1104_e5 is searched for.

In this case, a plurality of the attack scenario elements are included in the related attack information 1105, and the scheduled collection unit 108 may perform scheduled collection of a log that possibly includes a subsequent one of the attack scenario elements, as in the process by the scheduled search unit 1010.

When the attack possibility determination unit 107 determines that the attack of only a part of the attack scenario elements out of the attack scenario element 3 of 1104_e3, the attack scenario element 4 of 1104_e4, and the attack scenario element 5 of 1104_e is likely to occur, the process may be performed with respect to the attack scenario element associated with the attack determined to occur by the scheduled search unit 1010. Alternatively, the process may be performed with respect to all of the attack scenario element 3 of 1104_e3, the attack scenario element 4 of 1104_e4, and the attack scenario element 5 of 1104_e5 by the scheduled search unit 1010, irrespective of the result of the determination.

As mentioned above, the log analysis cooperation system according to this embodiment may compute a predicted attack occurrence date and time and may perform scheduled search by giving information on a search time and a search interval for a search schedule condition even if an occurrence interval between attacks included in an attack scenario is unknown.

The log analysis cooperation system according to this embodiment may compute a predicted attack occurrence date and time and may perform scheduled collection of a log by giving information on a collection time and a collection interval for a collecting schedule condition.

Seventh Embodiment

In this embodiment, a description will be mainly directed to a difference from the first to sixth embodiments.

Same reference signs are assigned to functional configurations which are the same as those described in the first to sixth embodiments, and description of the functional configurations may be thereby omitted.

Information on an interval and a relationship between attacks may be unknown, depending on an attack type. In this embodiment, a description will be given about operation of the log analysis cooperation system 1000 using a scenario when neither the interval nor the relationship between attacks is included in an attack scenario 1104.

The attack scenario 1104 in FIG. 5 describes the interval 1 of 1104_s1, the interval 2 of 1104_s2, and the sequence of the attacks indicated by arrows, as the relationship between the attacks. In this embodiment, the attack scenario 1104 not including an occurrence interval between the attacks, such as the interval 1 or the interval 2, and not including the relationship between the attacks is used.

That is, the attack scenario 1104 is as follows, for example:

the attack scenario element 1 of 1104_e1, the attack scenario element 2 of 1104_e2, the attack scenario element 3 of 1104_e3, the attack scenario element 4 of 1104_e4, and the attack scenario element 5 of 1104_e5.

In this manner, the attack scenario 1104 according to this embodiment has no "intervals" and no "arrows", and represents the attacks that constitute the attack scenario.

A difference from the operation of the log analysis cooperation apparatus 1 in the sixth embodiment will be described below.

In this embodiment, the attack scenario DB search unit 103 outputs the attack identification information 1103 (assumed to be the same as the example in the first embodiment) to the attack scenario DB 1013 to obtain the attack scenario 1104. In this case, the attack scenario DB search unit 103 searches for the "attack scenario in which the attack identification information 1104_a of the attack scenario element 1104_e" includes the attack ID, which is a component of the attack identification information 1103, for example.

The related attack extraction unit 104 inputs the attack scenario 1104, and analyzes the attack scenario 1104, using the processing device. The related attack extraction unit 104 extracts information related to the attacks included in the notified attack scenario 1104. In this case, the related attack extraction unit 104 inputs a related attack extraction condition 1203. The related attack extraction condition 1203 specifies "all the attacks excluding the notified attack".

It is assumed that the attack scenario 1104 is as follows and the attack ID included in warning information 1102 is the attack ID of the attack scenario element 2 of 1104_e2.

"the attack scenario element 1 of 1104_e1, the attack scenario element 2 of 1104_e2, the attack scenario element 3 of 1104_e3, the attack scenario element 4 of 1104_e4, the attack scenario element 5 of 1104_e5".

Related attack information 1105 to be extracted by the related attack extraction unit 104 is as follows, excluding the attack scenario element 2 from the attack scenario 1104:

"the attack scenario element 1 of 1104_e1, the attack scenario element 3 of 1104_e3, the attack scenario element 4 of 1104_e4, and the attack scenario element 5 of 1104_e5".

Next, each of the related attack extraction unit 104, the attack possibility determination unit 107, the scheduled search unit 1010, and the scheduled collection unit 108 performs a process similar to that in the sixth embodiment with respect to each of the attack scenario element 1, the attack scenario element 3, the attack scenario element 4, and the attack scenario element 5.

That is, the scheduled search unit 1010 individually performs log search for each attack scenario element by applying a time, a period of time, and the number of times for performing the search indicated in a search schedule condition 1205 to the attack occurrence date and time of the attack scenario element 2 of 1104_e2. Then, the scheduled search unit 1010 inputs a search result 1115 about each attack scenario element.

The scheduled collection unit 108 performs log collection in a similar manner.

In this embodiment, a condition of "determining that an attack in accordance with the attack scenario 1104 is in progress when s % of the number of the attack scenario elements in the attack scenario 1104 are searched for within t hours by the scheduled search", for example is added to the search schedule condition 1205. In this condition, t may be zero, plus (indicating the future), or minus (indicating the past), or plus and minus (before and after a predicted attack occurrence date and time), or zero.

Assume that s=60% and t=720, for example. Then, the scheduled search unit 1010 determines that the attack in accordance with the attack scenario is in progress when two or more (three or more including the attack scenario element 2) of the attack scenario element 1, the attack scenario element 3, the attack scenario element 4, and the attack scenario element 5 have been searched for within 720 hours (30 days), and outputs a search result 1116 to the output unit 1012. The scheduled search unit 1010 may output a search result of each search as a search result 1116, independently of the determination as to the progress of the attacks.

Alternatively, as in "determining that an attack in accordance with the attack scenario 1104 is in progress, when s % of the number of the attacks in the attack scenario 1104 including a plurality of times the same attack is searched for, are searched for within t hours by scheduled searches", an instruction to include the plurality of times the same attack is searched for in the number of the attacks in the attack scenario 1014 may be given for the schedule condition 1205.

As mentioned above, the log analysis cooperation system according to this embodiment has the following effect. That is, even if an occurrence interval between attacks included in an attack scenario is unknown and a relationship between the attacks is unknown in the attack scenario, an attack in accordance with the scenario may be searched for and establishment of the attack may be determined by giving information on a search period and a search interval for a search schedule condition and setting search for a certain number of elements included in the attack scenario to the condition of the establishment of the attack.

The log analysis cooperation system according to this embodiment has the following effect. That is, by giving information on a collection period and a collection interval for a collecting schedule condition, a predicted attack occurrence date and time may be computed, and scheduled log collection may be performed. The information on the collection period and the collection interval to be given for the collecting schedule condition in this embodiment is information indicating "within t hours from the predicted attack occurrence date and time" or the like, for example. This embodiment is different from the sixth embodiment in this respect.

Eighth Embodiment

In this embodiment, a description will be mainly directed to a difference from the first to seventh embodiments.

Same reference signs are assigned to functional configurations which are the same as those described in the first to seventh embodiments, and description of the functional configurations may be thereby omitted.

It has been assumed in the first embodiment that the attack target in the attack scenario is set to the asset indicated by the warning information 1102. However, an attack to a different asset may be performed, according to the type of the attack.

In this embodiment, a Destination IP/Port, an asset ID, and so forth are input to the asset DB search unit 106 as attack destination information of asset search information 1108. Then, when the Destination IP/Port, the asset ID, and so forth are output to the asset DB 1015 as the asset search information 1108, the asset DB 1015 returns to the asset DB search unit 106 information on an asset indicated by the Destination IP or the asset ID and a different asset that may be connected from the Destination IP through a network, as asset information 1109.

When the Port is indicated in the asset search information 1108, the asset DB 1015 returns information on an asset that uses that Port, as the asset information 1109.

That is, the number of the asset information 1109 may be plural.

The asset DB 1015 may extract an asset that uses a same OS or a same application (having a same version and a same patch application state) as the asset to be identified by the Destination IP/Port or the asset ID.

The asset DB search unit 106 may input related attack information 1105 (though not illustrated), may include in the asset search information 1108 information on an asset that may be attacked, based on information on a product to be affected (included as a product ID, version information, and a patch ID) included in attack information 1104_*b* of an attack scenario element 1104_*e* in the related attack information 1105, and may output resulting information to the asset DB 1015. In this case, the asset DB 1015 outputs the asset that uses the product to be affected by the attack, as the asset information 1109.

When the type of an attack target such as an authentication server/file server/DB server/router/switch included in the attack information 1104_*b* is indicated as a keyword/other information, the asset DB 1015 may perform a search, based on the type of the attack target, and then may output the asset information 1109.

There may be one or more of the attack scenario elements 1104_*e*. Thus, the search with respect to each attack scenario element 1104_*e* is performed in that case.

With the above-mentioned arrangement, information on the asset that may be the target of the attack predicted to subsequently occur may be obtained.

Then, the attack possibility determination unit 107 performs a process (by each of the attack possibility determination unit 107, the scheduled search unit 1010, the scheduled collection unit 108, and the output unit 1012) similar to that in the first embodiment, with respect to each of one or more of the asset information 1109.

In the log analysis cooperation apparatus 1 according to this embodiment, a condition instructing to "search for information on an asset indicated by the Destination IP and a different asset that may be connected from the Destination IP" given in the above description, for example, is input to the asset DB search unit 106, as an asset search condition (though not illustrated).

As mentioned above, in the log analysis cooperation system according to this embodiment, it is so arranged that an asset that may be attacked as well as an attacked asset may be searched for. Thus, there is an effect that a log search range may be expanded for the asset that may be attacked in accordance with a scenario and a failure of a log search is therefore reduced.

As described above, the log analysis cooperation system 1000 having the following characteristics has been described in each of the first to eighth embodiments.

The log analysis cooperation apparatus (log analysis system) receives detection of an attack from the SIEM apparatus (SIEM system).

The log analysis cooperation system refers to an attack scenario including information on the detected attack that has been received from the SIEM system, and extracts information on an attack that is described in that attack scenario and may occur in the future.

The log analysis cooperation apparatus refers to asset information of an asset targeted for the attack, refers to a security countermeasure, checks the security measure with the information on the attack that may occur in the future, and then determines whether the attack which may occur in the future is likely to actually occur.

When the log analysis cooperation apparatus determines that the attack which may occur in the future is likely to actually occur, the log analysis cooperation apparatus instructs the log analysis system to perform scheduled execution of an instruction to search a log with a trace of the attack to be left therein at a predicted occurrence time of the attack.

The log analysis cooperation apparatus obtains information in an attack that may have occurred in the past according to the attack scenario and instructs the log analysis system to search for a trace of the attack.

The above-mentioned log analysis cooperation system 1000 makes detection/follow-up of an APT (attack) by log analysis to be more efficient, by taking advantage of the features of the SIEM system and the log analysis system. Consequently, the log analysis cooperation system 1000 utilizes the SIEM system for APT detection using correlation analysis that is not complex and correlation analysis of events that do not frequently occur. With respect to a subsequent APT attack, scheduled search is performed at a predicted occurrence time of the subsequent attack, using the log analysis system and according to an APT attack scenario. The log analysis may be thereby made to be more efficient.

Further, the log analysis cooperation system 1000 having the following characteristics has been described in each of the first to eighth embodiments.

When the log analysis cooperation apparatus determines that an attack which may occur in the future is likely to actually occur, the log analysis cooperation apparatus outputs to the log analysis system (or the logger) an instruction to collect a log with a trace of the attack to be left therein at a predicted occurrence time of the attack.

With this arrangement, even a device for which it is difficult to constantly perform log collection may perform efficient log collection.

Though the description in each of these embodiments has been given about the case where the corresponding entry is searched for from the security countermeasure DB 1014 or the asset DB 1015, a corresponding entry may be unregistered or may not be searched for.

Though the associated countermeasure status 1107' or the associated asset information 1109 is empty in that case, the attack possibility determination unit 107 may perform the process, assuming that the related attack information 1105 is to be generated. Assume that a plurality of attack scenario elements are included in the related attack information 1105, the countermeasure status 1107' and the asset information 1109 are searched for with respect to a part of the attack scenario elements, and no countermeasure status 1107' and no asset information 1109 are searched for with respect to the remaining attack scenario elements, the process may be performed, assuming that an attack is predicted to occur with respect to each of the remaining attack scenario elements.

The above description has been given about the embodiments of the present invention. Two or more of these embodiments may be combined and carried out. Alternatively, one of these embodiments may be partially carried out. Alternatively, two or more of these embodiments may be partially combined and may be carried out. The present invention is not limited to these embodiments, and various modifications of the present invention may be made, if necessary.

REFERENCE SIGNS LIST

1: log analysis cooperation apparatus, 10: authentication server, 11: password reset apparatus, 101: input unit, 102: warning interpretation unit, 103: attack scenario DB search unit, 104: related attack extraction unit, 105: security countermeasure search unit, 106: asset DB search unit, 107: attack possibility determination unit, 108: scheduled collection unit, 109: external cooperation unit (collection), 801: password generation unit, 802: conversion rule selection unit, 803: conversion parameter value generation unit, 804: document template selection unit, 804a: conversion table, 805: password reset notification document generation unit, 806: conversion rule document template DB, 901: logger, 902: SIEM apparatus, 903: log analysis apparatus, 904: communication device, 904a: computer, 904b: network device, 904c: security device, 905: mobile device, 911: log, 912: detection rule, 915, 916: scheduled search, 917, 918: search result, 1000: log analysis cooperation system, 1010: scheduled search unit, 1011: external cooperation unit (search), 1012: output unit, 1013: attack scenario DB, 1014: security countermeasure DB, 1015: asset DB, 1014: security countermeasure DB, 1071: external cooperation unit (countermeasure), 1101: data, 1102: warning information, 1103: attack identification information, 1104: attack scenario, 1105: related attack information, 1106: related attack search information, 1107: countermeasure information, 1107': countermeasure status, 1108: asset search information, 1109: asset information, 1110: log collection information, 1111: collection instruction, 1112: collection result, 1113: log search information, 1114: search instruction, 1115: search result, 1116: search result, 1117: password reset instruction, 1119: right change instruction, 1201, 1201': warning information, 1202: scenario extraction condition, 1203: related attack extraction condition, 1204: collecting schedule condition, 1205: search schedule condition, 1206: collection instruction, 1207: collection result, 1208: search instruction, 1209: search result, 1211: right change instruction, 1212: password reset instruction, 1901: LCD, 1902: keyboard, 1903: mouse, 1904: FDD, 1905: CDD, 1906: printer, 1911: CPU, 1912: bus, 1913: ROM, 1914: RAM, 1915: communication board, 1920: HDD, 1921: operating system, 1922: window system, 1923: programs, 1924: files, 8201: password reset instruction, 8202: password reset notification text, 8203: resetting password

The invention claimed is:

1. An attack analysis system including a log collection apparatus that includes log collection circuitry and that collects a log of at least one device connected to a network being monitored and stores the log in a storage device as log information, a detection apparatus that includes detection circuitry and that detects an attack on the network being monitored, and an analysis apparatus that includes analysis circuitry and that analyzes the log information collected by the log collection apparatus, the attack analysis system comprising:

a cooperation apparatus that includes cooperation circuitry and that is connected to the detection apparatus and connected to the analysis apparatus, wherein upon detection of the attack on the network being monitored, the detection apparatus transmits to the cooperation apparatus warning information including an attack identifier for identifying the detected attack and an attack occurrence time at which the detected attack has occurred, the cooperation apparatus includes an attack scenario information storage unit, implemented by the cooperation circuitry, that stores attack scenario information in a storage device in advance, the attack scenario information including a plurality of attack identifiers for identifying a respective plurality of attacks predicted to occur on the network being monitored, a scheduled analysis request unit, implemented by the cooperation circuitry, that when the warning information is received from the detection apparatus, computes a predicted occurrence time of a subsequent attack that has not yet occurred and is predicted to occur at a time after the attack occurrence time at which the detected attack has occurred, based on the warning information received and the attack scenario information stored by the attack scenario information storage unit, and transmits to the analysis apparatus a scheduled analysis request that is a request for analyzing the log information at the predicted occurrence time computed, the subsequent attack being one of the plurality of attacks included in the attack scenario information and being predicted to occur at the time after the attack occurrence time, and the analysis apparatus analyzes the log information at the predicted occurrence time, based on the scheduled analysis request transmitted from the scheduled analysis request unit of the cooperation apparatus.

2. The attack analysis system according to claim 1, wherein the cooperation apparatus includes:
   a subsequent attack information acquisition unit, implemented by the cooperation circuitry, that obtains an attack identifier for the subsequent attack from the attack scenario information;
   wherein the scheduled analysis request unit includes the attack identifier for the subsequent attack obtained from the subsequent attack information acquisition unit and the predicted occurrence time in the scheduled analysis request and transmits the scheduled analysis request; and
   wherein the analysis apparatus analyzes the log information at the predicted occurrence time, based on the attack identifier for the subsequent attack and the predicted occurrence time included in the scheduled analysis request transmitted from the scheduled analysis request unit, and determines whether or not the subsequent attack has occurred at the predicted occurrence time.

3. The attack analysis system according to claim 2, wherein the attack scenario information storage unit stores in the storage device the attack scenario information including an occurrence order of the plurality of attacks and an occurrence interval of two attacks that are successive in the order, in advance;
   wherein, upon receipt of the warning information from the detection apparatus, the subsequent attack information acquisition unit obtains the attack identifier for the subsequent attack that is a subsequent attack predicted to occur subsequent to the attack identified by the attack identifier included in the warning information and a subsequent occurrence interval that is an occurrence interval between the attack identified by the attack identifier included in the warning information and the subsequent attack, based on the warning information received and the attack scenario information stored by the attack scenario information storage unit; and
   wherein the scheduled analysis request unit computes the predicted occurrence time at which the subsequent attack is predicted to occur, based on the subsequent occurrence interval obtained by the subsequent attack information acquisition unit and the attack occurrence time included in the warning information.

4. The attack analysis system according to claim 3, wherein the cooperation apparatus includes:
   a preceding attack information acquisition unit, implemented by the cooperation circuitry, that, upon receipt of the warning information from the detection apparatus, obtains an attack identifier for an analysis attack target that is a preceding attack which may have occurred immediately preceding to the attack identified by the attack identifier included in the warning information and a preceding occurrence interval that is an occurrence interval between the attack identified by the attack identifier included in the warning information and the preceding attack, based on the warning information received and the attack scenario information stored by the attack scenario information storage unit; and
   a time-specified analysis request unit, implemented by the cooperation circuitry, that computes a possible occurrence time at which the preceding attack may have occurred, based on the preceding occurrence interval obtained by the preceding attack information acquisition unit and the attack occurrence time included in the warning information, and transmits to the analysis apparatus a time-specified analysis request that is a request for analyzing the log information at the possible occurrence time computed; and
   wherein the analysis apparatus analyzes the log information at the possible occurrence time, based on the time-specified analysis request transmitted from the time-specified analysis request unit of the cooperation apparatus.

5. The attack analysis system according to claim 2, wherein the attack scenario information storage unit stores in the storage device the attack scenario information including an occurrence order of the plurality of attacks, in advance;
   wherein, upon receipt of the warning information from the detection apparatus, the subsequent attack information acquisition unit designates as the subsequent attack a subsequent attack predicted to occur subsequent to the attack identified by the attack identifier included in the warning information and obtains the attack identifier for the subsequent attack, based on the warning information received and the attack scenario information stored by the attack scenario information storage unit; and
   wherein the scheduled analysis request unit inputs a search schedule condition for computing the predicted occurrence time, and computes the predicted occurrence time, based on the search schedule condition input and the attack occurrence time.

6. The attack analysis system according to claim 5, wherein the scheduled analysis request unit inputs the search schedule condition including a search period starting from the attack occurrence time and a search interval.

7. The attack analysis system according to claim 2, wherein, upon receipt of the warning information from the detection apparatus, the subsequent attack information acquisition unit designates as an analysis attack an attack other than the attack identified by the attack identifier included in the warning information, and obtains the attack identifier for the subsequent attack, based on the warning information received and the attack scenario information stored by the attack scenario information storage unit; and
   wherein the scheduled analysis request unit inputs a search schedule condition for computing the predicted occurrence time, and computes the predicted occurrence time, based on the search schedule condition input and the attack occurrence time.

8. The attack analysis system according to claim 7, wherein the scheduled analysis request unit inputs the search schedule condition including a search period starting from the attack occurrence time and a determination condition for determining that the subsequent attack has occurred, and the scheduled analysis request unit further includes the determination condition in the scheduled analysis request and transmits the scheduled analysis request; and wherein the analysis apparatus determines whether or not the subsequent attack has occurred at the predicted occurrence time, based on the attack identifier for the subsequent attack, the predicted occurrence time, and the determination condition that are included in the scheduled analysis request transmitted from the scheduled analysis request unit.

9. The attack analysis system according to claim 5, wherein the warning information further includes information on an attack target asset that is a target of the detected attack; and wherein the subsequent attack information acquisition unit extracts information on the attack target asset targeted for the attack identified by the attack identifier included in the warning information, based on the warning information and the attack scenario information stored by the attack scenario information storage unit, and includes a related attack in the subsequent attack, the related attack targeting a related target asset that is in the form of asset information related to the information on the attack target asset extracted.

10. The attack analysis system according to claim 1, wherein the network being monitored connects a specific device whose log is collected by the log collection apparatus when the log collection apparatus receives a log collection instruction;

wherein the scheduled analysis request unit transmits the log collection instruction to the log collection apparatus before transmitting the scheduled analysis request to the analysis apparatus, the log collection instruction being an instruction to collect the log of the specific device at the predicted occurrence time;

wherein, upon receipt of the log collection instruction from the scheduled analysis request unit, the log collection apparatus collects the log of the specific device at the predicted occurrence time based on the log collection instruction received and stores the collected log as specific device log information in the storage device, and transmits a log collection response for the log collection instruction to the cooperation apparatus; and wherein, upon receipt of the log collection response from the log collection apparatus, the scheduled analysis request unit transmits a specific device analysis request to the analysis apparatus, the specific device analysis request being a request for analyzing the specific device log information at the predicted occurrence time.

11. The attack analysis system according to claim 3, wherein the subsequent attack information acquisition unit determines whether or not the subsequent attack predicted to occur subsequent to the attack identified by the attack identifier included in the warning information received from the detection apparatus is likely to succeed, and obtains the attack identifier for the subsequent attack and the subsequent occurrence interval when the subsequent attack information acquisition unit determines that the subsequent attack is likely to succeed.

12. The attack analysis system according to claim 11, wherein the network being monitored includes an authentication apparatus that authenticates an access right to the device by authentication information; and wherein, when the subsequent attack information acquisition unit determines that the subsequent attack is likely to succeed, the subsequent attack information acquisition unit determines whether or not the subsequent attack is an unauthorized access by spoofing, and when the subsequent attack is determined as being the unauthorized access by the spoofing, the subsequent attack information acquisition unit transmits, to the authentication apparatus, a right change request that is a request for changing the access right to the device.

13. The attack analysis system according to claim 12, wherein the authentication apparatus performs authentication, using a password as the authentication information; and wherein the subsequent attack information acquisition unit transmits to the authentication apparatus a password change request that is a request for changing the password when the subsequent attack is determined to the unauthorized access by the spoofing.

14. A cooperation apparatus included in an attack analysis system including a log collection apparatus that collects a log of at least one device connected to a network being monitored and stores the log in a storage device as log information, a detection apparatus that detects an attack on the network being monitored, and an analysis apparatus that analyzes the log information collected by the log collection apparatus, the cooperation apparatus being connected to the detection apparatus and connected to the analysis apparatus, the cooperation apparatus comprising:

circuitry configured to
upon detection of the attack on the network being monitored, receive from the detection apparatus warning information including an attack identifier for identifying the detected attack and an attack occurrence time at which the detected attack has occurred,
store attack scenario information in a storage device in advance, the attack scenario information including a plurality of attack identifiers for identifying a respective plurality of attacks predicted to occur on the network being monitored,
when the warning information is received from the detection apparatus, compute a predicted occurrence time of a subsequent attack that has not yet occurred and is predicted to occur at a time after the attack occurrence time at which the detected attack has occurred, based on the warning information received and the attack scenario information stored at the storage device, the subsequent attack being one of the plurality of attacks included in the attack scenario information and being predicted to occur at the time after the attack occurrence time, and
transmit to the analysis apparatus a scheduled analysis request that is a request for analyzing the log information at the predicted occurrence time computed.

15. An attack analysis cooperation method associated with an attack analysis system including a log collection apparatus that collects a log of at least one device connected to a network being monitored and stores the log in a storage device as log information, a detection apparatus that detects an attack on the network being monitored, and an analysis apparatus that analyzes the log information collected by the log collection apparatus, and a cooperation apparatus that is connected to the detection apparatus and connected to the analysis apparatus, the method comprising:

- by the detection apparatus, upon detection of the attack on the network being monitored, transmitting to the cooperation apparatus warning information including an attack identifier for identifying the detected attack and an attack occurrence time at which the detected attack has occurred;
- by the cooperation apparatus, storing attack scenario information in a storage device in advance, the attack scenario information including a plurality of attack identifiers for identifying a respective plurality of attacks predicted to occur on the network being monitored;
- by the cooperation apparatus, when the warning information is received from the detection apparatus, computing a predicted occurrence time of a subsequent attack that has not yet occurred and is predicted to occur after the attack occurrence time at which the detected attack has occurred, based on the warning information received and the attack scenario information stored at the storage device, and transmitting to the analysis apparatus a scheduled analysis request that is a request for analyzing the log information at the predicted occurrence time computed, the subsequent attack being one of the plurality of attacks included in the attack scenario information and being predicted to occur at the time after the attack occurrence time; and
- by the analysis apparatus, analyzing the log information at the predicted occurrence time, based on the scheduled analysis request transmitted from the cooperation apparatus.

16. A non-transitory computer-readable storage medium including computer executable instructions, wherein the instructions, when executed by a cooperation apparatus included in an attack analysis system including a log collection apparatus that collects a log of at least one device connected to a network being monitored and stores the log in a storage device as log information, a detection apparatus that detects an attack on the network being monitored, and an analysis apparatus that analyzes the log information collected by the log collection apparatus, the cooperation apparatus being a computer connected to the detection apparatus and connected to the analysis apparatus, cause the cooperation apparatus to perform a method, the method comprising:

- upon detection of the attack on the network being monitored, receiving from the detection apparatus warning information including an attack identifier for identifying the detected attack and an attack occurrence time at which the detected attack has occurred;
- storing attack scenario information in a storage device in advance, the attack scenario information including a plurality of attack identifiers for identifying a respective plurality of attacks predicted to occur on the network being monitored;
- when the warning information is received from the detection apparatus, computing a predicted occurrence time of a subsequent attack that has not yet occurred and is predicted to occur after the attack occurrence time at which the detected attack has occurred, based on the warning information received and the attack scenario information stored at the storage device, the subsequent attack being one of the plurality of attacks included in the attack scenario information and being predicted to occur at the time after the attack occurrence time; and
- transmitting to the analysis apparatus a scheduled analysis request that is a request for analyzing the log information at the predicted occurrence time computed.

* * * * *